United States Patent
Choi et al.

(10) Patent No.: US 11,356,814 B1
(45) Date of Patent: Jun. 7, 2022

(54) DECENTRALIZED AND SCALABLE RANGING AND POSITIONING OF DISTRIBUTED DEVICES

(71) Applicant: QUALCOMM Incorporated, San Diego, CA (US)

(72) Inventors: Chang-Sik Choi, Seoul (KR); Kapil Gulati, Belle Mead, NJ (US); Junyi Li, Chester, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/187,420

(22) Filed: Feb. 26, 2021

(51) Int. Cl.
*H04W 4/029* (2018.01)
*H04L 5/00* (2006.01)

(52) U.S. Cl.
CPC .......... *H04W 4/029* (2018.02); *H04L 5/0048* (2013.01)

(58) Field of Classification Search
CPC ............................ H04W 4/029; H04L 5/0048
See application file for complete search history.

(56) References Cited

U.S. PATENT DOCUMENTS

| 2012/0083278 A1* | 4/2012 | Kazmi | H04W 36/06 455/440 |
| 2018/0180703 A1* | 6/2018 | Kim | G01S 5/10 |

OTHER PUBLICATIONS

International Search Report and Written Opinion—PCT/US2022/070065—ISA/EPO—dated Apr. 13, 2022.

* cited by examiner

Primary Examiner — Kabir A Timory
(74) Attorney, Agent, or Firm — Weaver Austin Villeneuve & Sampson LLP

(57) ABSTRACT

Disclosed are some examples of techniques for decentralized and scalable ranging and positioning of distributed devices. For example, an anchor user equipment (UE) can detect, from initiator user equipments (UEs), respective initiator positioning reference signal (PRS) transmissions associated with respective initiator positioning sessions. Based on the initiator PRS transmissions, one or more characteristics of PRS messaging associated with the initiator positioning sessions can be determined. When the one or more characteristics satisfies a criterion or criteria, the anchor UE can broadcast an anchor PRS transmission indicating initiation of an anchor positioning session by the anchor UE.

30 Claims, 13 Drawing Sheets

DECENTRALIZED AND SCALABLE RANGING AND POSITIONING OF DISTRIBUTED DEVICES

FIELD OF DISCLOSURE

Aspects of the present disclosure generally relate to wireless communication and to techniques and apparatuses for ranging and positioning of distributed devices.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via a downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNodeB (gNB), an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3 GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an anchor UE is provided for positioning distributed devices. The anchor UE can include a transceiver, a memory and one or more processors communicatively coupled with the memory and the transceiver. The one or more processors can be configured to perform various operations. For instance, the anchor UE can detect, from initiator UEs, respective initiator positioning reference signal (PRS) transmissions associated with respective initiator positioning sessions. Based on the initiator PRS transmissions, one or more characteristics of PRS messaging associated with the initiator positioning sessions can be determined. When the one or more characteristics satisfies a criterion or criteria, the anchor UE can broadcast an anchor PRS transmission indicating initiation of an anchor positioning session by the anchor UE.

In some other aspects, a method for positioning distributed devices is provided. The method can be performed by an anchor UE and can include: detecting, from initiator UEs, respective initiator PRS transmissions associated with respective initiator positioning sessions; determining, based on the initiator PRS transmissions, one or more characteristics of PRS messaging associated with the initiator positioning sessions; determining that the one or more characteristics satisfies a criterion or criteria; and broadcasting, responsive to determining that the one or more characteristics satisfies the criterion or criteria, an anchor PRS transmission indicating initiation of an anchor positioning session by the anchor UE.

In some other aspects, an initiator UE is provided for positioning distributed devices. The initiator UE can include a transceiver, a memory and one or more processors communicatively coupled with the memory and the transceiver. The one or more processors can be configured to perform various operations. For instance, one or more initiator PRS transmissions associated with an initiator positioning session can broadcasted to UEs including an anchor UE. An anchor PRS transmission obtained from the anchor UE can indicate initiation of an anchor positioning session by the anchor UE. In the anchor positioning session, the anchor UE has an initiator role, and the initiator UE has a responder role. In response to obtaining the anchor PRS transmission, the initiator UE can stop or suspend initiation of positioning sessions.

In some other aspects, another method for positioning distributed devices is provided. The method can be performed by an initiator UE and can include: broadcasting, to UEs including an anchor UE, one or more initiator PRS transmissions associated with an initiator positioning session; obtaining, from the anchor UE, an anchor PRS transmission indicating initiation of an anchor positioning session by the anchor UE with the anchor UE having an initiator role and the initiator UE having a responder role; and stopping or suspending initiation of positioning sessions responsive to obtaining the anchor PRS transmission.

Aspects generally include a method, apparatus, system, computer program product, non-transitory computer-readable medium, user equipment, wireless communication device, and/or processing system as substantially described herein with reference to and as illustrated by the drawings and specification.

The foregoing has outlined rather broadly the features and technical advantages of some examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
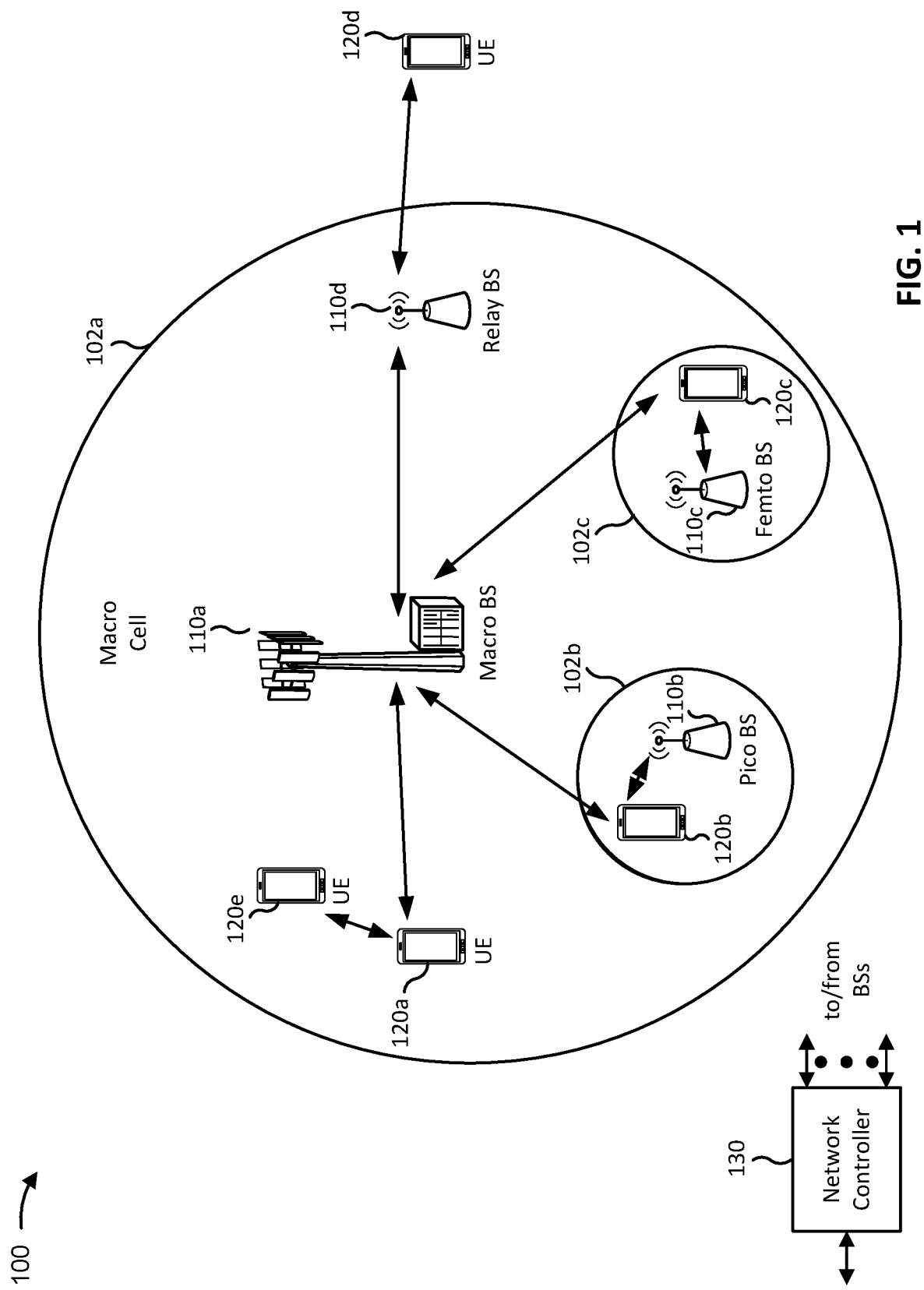
FIG. 1 is a diagram illustrating an example of a wireless network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Some of the disclosed aspects provide decentralized and scalable methods, apparatuses, systems, computer program products, non-transitory computer-readable media, UEs, wireless communication devices, and/or processing systems for positioning distributed devices such as pedestrian UEs and vehicle UEs. In some of the disclosed implementations, an anchor UE is configured to take on the role of an initiator, rather than a responder, of a positioning session when one or more conditions are satisfied. An anchor UE generally refers to a UE, which stores data identifying its position and normally operates as a responder in a positioning session. In some implementations, when the anchor UE operates as an initiator, a fewer number of positioning sessions with a reduced total amount of signaling may be carried out to achieve accurate positioning with minimal latency even when there are numerous UEs in a group with a limited number of anchor UEs. By applying some of the disclosed decentralized and scalable techniques, positioning can be configured and optimized for various implementations.

In conventional positioning sessions initiated by a number of non-anchor UEs, the ranging capability of an anchor UE acting as a responder could be constrained due to limitations on resources normally available to anchor UEs. For instance, if twenty pedestrian UEs were initiating respective positioning sessions in a group of UEs including only one or two anchor UEs operating as responders, in a pre-PRS exchange, all of the pedestrian UEs would request to be informed by an anchor UE of data such as PRS ID, bandwidth, and other parameters. With this relatively large number of initiator UEs, it could become difficult for the anchor UE to allocate its limited resources for all of the different positioning sessions. Thus, the number of positioning sessions could be limited by the capability of the responding anchor UEs. Some of the disclosed techniques, on the other hand, provide scalability in terms of increasing the number of UEs in a group even when the number of anchors remains small.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with UEs and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. In some aspects, two or more UEs 120 may communicate (e.g., using one or more sidelink channels) to determine a position of a UE 120. For example, the UEs 120 may exchange positioning reference signals (PRSs) to determine the location of a UE 120. The UEs 120 may use a time of transmission of a PRS and a time of reception of a PRS, among other information carried by the PRS, to determine the location of the UE 120.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, devices of wireless network 100 may communicate in an unlicensed electromagnetic spectrum band. Prior to gaining access to, and communicating over, an unlicensed radio frequency spectrum band, a device may perform a listen before talk (LBT) procedure to contend for access to the unlicensed electromagnet spectrum band (e.g., to determine whether a channel of the unlicensed electromagnetic spectrum band is available).

As indicated above, FIG. 1 is provided as an example. Other examples may differ from what is described with regard to FIG. 1.

Figure 2:
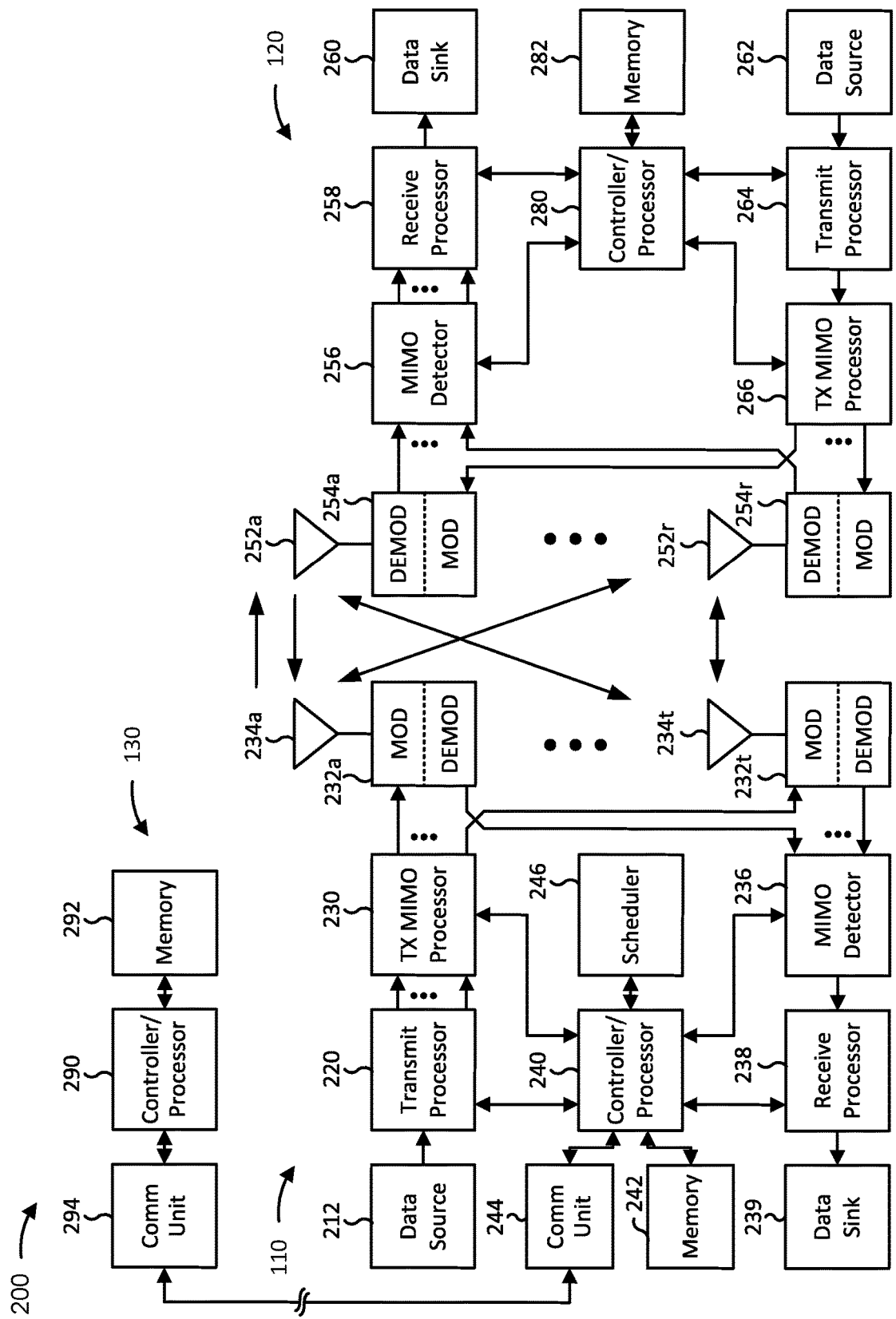
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with techniques for ranging and positioning of distributed devices, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 1000 of FIG. 10, process 1100 of FIG. 11 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, process 1000 of FIG. 10, process 1100 of FIG. 11 and/or other processes as described herein. In some aspects, executing instructions may include running the instructions, converting the instructions, compiling the instructions, interpreting the instructions, and/or the like.

In some aspects, a UE (e.g., UE 120) includes means for identifying a plurality of UEs for a UE positioning session; means for identifying a set of parameters for the UE positioning session; means for broadcasting information indicating the UE positioning session; means for receiving, from the plurality of UEs, a set of PRSs based at least in part on the set of parameters; and/or means for broadcasting, based at least in part on the set of PRSs, positioning information. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for receiving, from a UE, broadcasted information indicating a set of parameters for a UE positioning session; means for broadcasting a first set of PRSs based at least in part on the set of parameters; means for receiving a second set of PRSs based at least in part on the set of parameters; and/or broadcasting positioning information, based at least in part on at least one of the first set of PRSs or the second set of PRSs. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

As indicated above, FIG. 2 is provided as an example. Other examples may differ from what is described with regard to FIG. 2.

A wireless communication system may determine positioning of wireless communication devices based at least in part on a positioning reference signal (PRS). For example, UEs may perform a UE positioning session to determine locations of the UEs relative to one another. In some aspects, a PRS may be a signal that is generated based at least in part on a pseudo-noise (PN) sequence, such as a quadrature phase shift keying (QPSK) modulated random sequence. Some PRSs may use a large bandwidth in order to improve ranging.

A UE positioning session may include a pre-PRS stage, a PRS stage, and a post-PRS stage. The pre-PRS stage may involve the transmission of information regarding the UE positioning session. The PRS stage may involve the transmission of PRSs by UEs to facilitate the UE positioning session. The post-PRS stage may involve the determination of measurements based at least in part on the PRSs, the determination of positioning information based at least in part on the measurements, and the transmission of the positioning information. A UE performing a UE positioning session may determine a location of the UE based at least in part on a known location of another UE, which may be determined based at least in part on the positioning information. For example, the other UE may transmit positioning information indicating the location of the other UE so that the UE can determine an absolute range relative to the location of the other UE (referred to as an anchor). In some aspects, ranging may be based at least in part on a difference in a transmission time of a PRS and an arrival time of the PRS.

A UE positioning session may be performed in a pair-wise fashion. For example, a first UE and a second UE may perform the pre-PRS stage, the PRS stage, and the post-PRS stage with each other by signaling the relevant information between each other. If a UE is to perform UE positioning sessions with multiple UEs, such as to triangulate a position of the UE or one or more other UEs, the UE may perform pair-wise operations with each UE of the multiple UEs. However, performing the UE positioning session in a pair-wise fashion may involve significant overhead, which may increase power consumption and communication resource usage of UEs performing the UE positioning session.

Some techniques and apparatuses described herein provide for a UE to perform a UE positioning session with a group of UEs. For example, a first UE may select a group of UEs for a UE positioning session. In some aspects, the group of UEs may include multiple UEs. For example, the first UE may select the group of UEs based at least in part on basic safety messages (BSMs) transmitted by the group of UEs. The first UE may determine parameters for the UE positioning session, and may broadcast the parameters to the group of UEs. The first UE and the group of UEs may broadcast PRSs, and may broadcast positioning information based at least in part on the PRSs. In some aspects, the UE may configure the other UEs to transmit multiple PRSs in association with a single pre-PRS stage and/or a single post-PRS stage. In this way, overhead is reduced relative to performing pair-wise UE positioning sessions, which reduces power consumption and communication resource usage of the UEs performing the UE positioning sessions.

Figure 3:
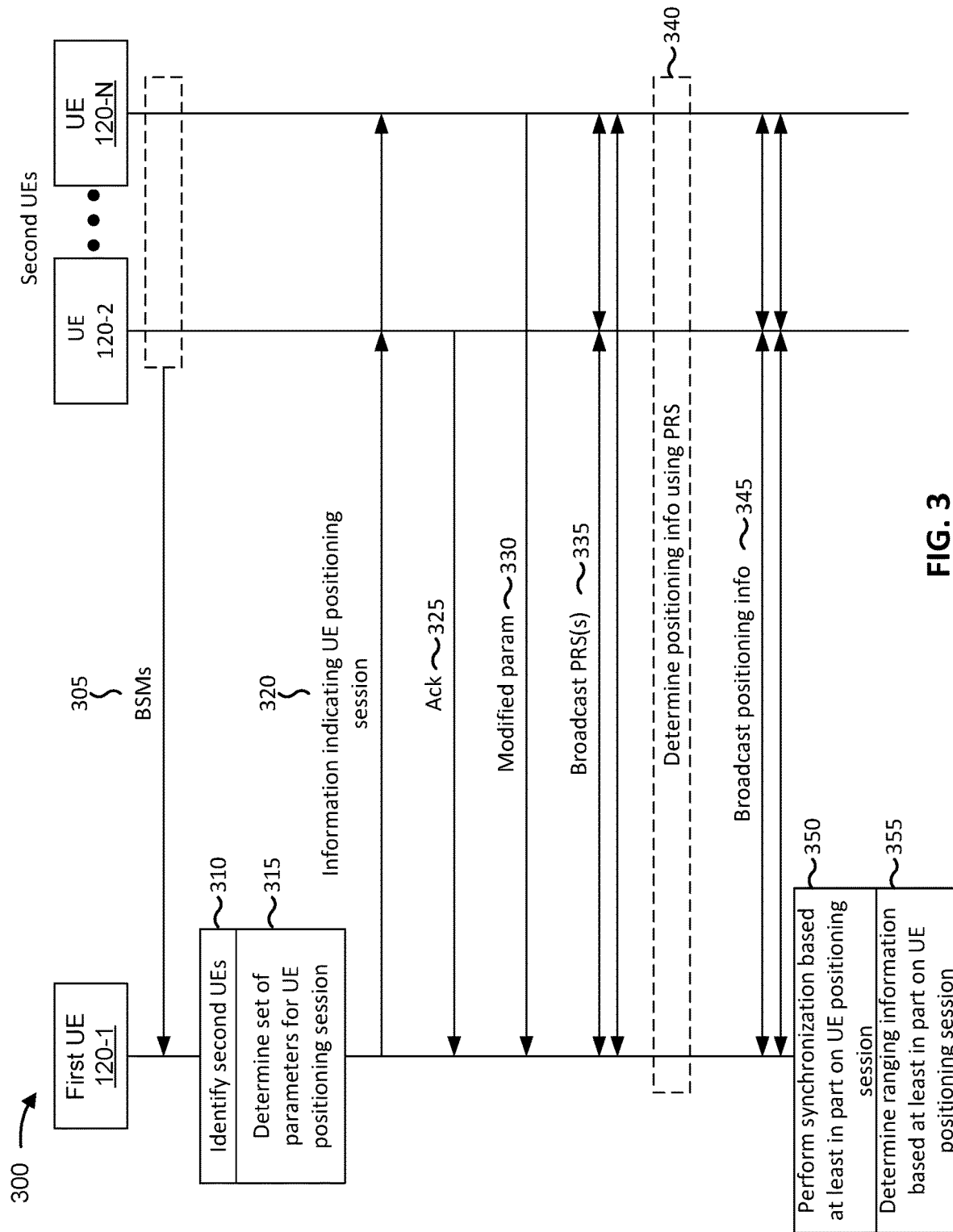
FIG. 3 is a diagram illustrating an example of a UE positioning session for a group of UEs, in accordance with various aspects of the present disclosure.

FIG. 3 is a diagram illustrating an example 300 of a UE positioning session for a group of UEs, in accordance with various aspects of the present disclosure. As shown, example 300 includes a first UE 120-1 and a plurality of second UEs 120-2 through 120-N. The first UE 120-1 is referred to herein as a first UE, and the plurality of second UEs 120-2 through 120-N are referred to herein as a plurality of second UEs. In some aspects, the communications between UEs of FIG. 3 may be performed via a sidelink interface, such as a PC5 interface or a similar interface.

As shown by reference number 305, the first UE may receive basic safety messages (BSMs) from the plurality of second UEs. For example, the plurality of second UEs may transmit BSMs. A BSM may be a communication that indicates information regarding a UE's position, location, heading, speed, acceleration, and/or other information indicating a UE's state and/or predicted path. In some aspects, a BSM may carry information regarding a vehicle associated with a UE. In some aspects, a UE may transmit BSMs periodically. In some aspects, the first UE may receive a different signal than a BSM from a second UE. In other words, the techniques and apparatuses described herein are not limited to identifying the second UEs based at least in part on BSMs transmitted by the second UEs.

As shown by reference number 310, the first UE may identify the plurality of second UEs based at least in part on the BSMs. For example, the first UE may select the plurality of second UEs for the UE positioning session. In some aspects, the first UE may identify the plurality of second UEs based at least in part on a measurement associated with a BSM, location information indicated by a BSM (e.g., an estimated distance between the first UE and a second UE), or another criterion.

As shown by reference number 315, the first UE may determine a set of parameters for the UE positioning session. In some aspects, the first UE may determine a time associated with broadcasting a PRS (e.g., a PRS broadcast time). For example, the first UE may determine a time for the first UE to broadcast a PRS. As another example, the first UE may determine a time for a second UE to broadcast a PRS. If a UE (e.g., the first UE or a second UE) is to transmit multiple PRSs, then the first UE or the second UE may determine times for each of the multiple PRSs.

In some aspects, the first UE may determine a sequence for a PRS. For example, the first UE may determine a root sequence, a cyclic shift, an initialization, or another parameter relating to a sequence, for generation of a PRS to be transmitted by the first UE. As another example, the first UE may determine a root sequence, a cyclic shift, an initialization, or another parameter relating to a sequence, for generation of a PRS to be transmitted by a second UE. If a UE (e.g., the first UE or a second UE) is to transmit multiple PRSs, then the first UE or the second UE may determine sequences for each of the multiple PRSs.

In some aspects, the first UE may determine a number of UE positioning sessions to perform. For example, the first UE may determine a number of pre-PRS messages to transmit, a number of PRSs to transmit, and/or a number of positioning information messages to transmit. As another example, the first UE may determine a number of times to perform the operations shown by reference numbers 320-345. Thus, the UE may perform multiple iterations of the UE positioning sessions based at least in part on identifying a plurality of second UEs, which reduces overhead relative to performing the UE positioning session in a pair-wise fashion or initiating separate UE positioning sessions for each iteration. In some aspects, the number of UE positioning sessions to perform may be based at least in part on a length of time. For example, the first UE may determine a length of time for which to perform UE positioning sessions, and may determine the number of UE positioning sessions based at least in part on the length of time and a length of a UE positioning session.

In some aspects, the first UE may determine a number of PRSs to be broadcasted by the first UE or the plurality of second UEs. For example, the first UE may determine that the first UE and the plurality of second UEs are each to broadcast a single PRS. As another example, the first UE may determine that the first UE and the plurality of second UEs are each to broadcast multiple PRSs. Approaches for broadcasting multiple PRSs are described in more detail in connection with FIGS. 4 and 5.

As shown by reference number 320, the first UE may broadcast information indicating the UE positioning session. The information indicating the UE positioning session is referred to herein as a pre-PRS message. As further shown, the plurality of second UEs may receive the pre-PRS message. The pre-PRS message may indicate information regarding the UE positioning session, such as any one or more of the parameters determined in connection with reference number 315. In some aspects, the pre-PRS message may indicate that the plurality of second UEs are to perform the UE positioning session, and the plurality of second UEs may determine parameters for the UE positioning session based at least in part on receiving the pre-PRS message. By broadcasting the pre-PRS message, the first UE may conserve power and communication resources that would otherwise be used to unicast or transmit pre-PRS messages to each second UE of the plurality of second UEs.

As shown by reference number 325, in some aspects, a second UE may transmit (e.g., broadcast) an acknowledgment of a pre-PRS message. For example, the second UE may transmit information indicating whether the pre-PRS message transmitted by the first UE (or another second UE) was successfully received by the second UE. As shown by reference number 330, in some aspects, a second UE may transmit (e.g., broadcast) information indicating a modified parameter for the UE positioning session. For example, the second UE may determine a modified parameter, and may transmit a message indicating the modified parameter to the first UE. In some aspects, the modified parameter may indicate a time associated with a PRS, a sequence for a PRS, and/or the like. In some aspects, the modified parameter may be a proposed parameter, which the first UE may determine to use or not to use. In some aspects, the second UE may transmit an indication of a set of parameters for the UE positioning session, such as a set of parameters determined by the second UE (e.g., based at least in part on a parameter signaled by the first UE or independently of signaling from the first UE).

The messages shown by reference numbers 320, 325, and 330 may be referred to as pre-PRS messages. Furthermore, one or more of the operations of example 300 shown by reference numbers 305, 310, 315, 320, 325, and 330 may be referred to as the pre-PRS stage of the UE positioning session. By identifying the plurality of second UEs and broadcasting the pre-PRS message shown by reference number 320, the first UE may conserve power and communication resources that would otherwise be used to perform UE positioning sessions individually with each second UE. In some aspects, one or more of the messages shown by reference numbers 320, 325, and 330 may be transmitted in licensed spectrum (e.g., spectrum designated by a regulatory body to be reserved for organizations that have been granted a license to operate in the spectrum), which may improve reliability relative to transmitting such messages in unlicensed spectrum. In some aspects, one or more of the messages shown by reference numbers 320, 325, and 330 may be transmitted in unlicensed spectrum (e.g., spectrum that does not require a license for operation), which may improve versatility of transmission of such messages.

As shown by reference number 335, the first UE and the plurality of second UEs may broadcast PRSs. For example, the first UE and the plurality of second UEs may each broadcast a single PRS. As another example, the first UE and the plurality of second UEs may each broadcast multiple PRSs. The first UE and the plurality of second UEs may broadcast the PRSs in accordance with parameters for the UE positioning session, such as parameters determined by the first UE as shown by reference number 315, or parameters determined and signaled by a second UE, such as shown by reference number 330. For example, the first UE and the plurality of second UEs may broadcast the PRSs at times indicated by the parameters and/or using sequences indicated by the parameters.

In some aspects, the PRSs may be transmitted in licensed spectrum, which may improve reliability and precision relative to transmitting such messages in unlicensed spectrum. In some aspects, the PRSs may be transmitted in unlicensed spectrum (e.g., spectrum that does not require a license for operation), which may reduce costs associated with implementation. In some aspects, a UE may perform a channel access operation, such as a listen-before-talk (LBT) operation, to access unlicensed spectrum for transmission of a PRS. In some aspects, the UE may transmit a PRS without the first UE performing a channel access operation for the transmission of the PRS, which may reduce latency and conserve resources used to perform the channel access operation. The transmission of the PRSs may be referred to as a PRS stage of the UE positioning session.

In some aspects, a PRS exchange procedure between UEs 120 may be deployed in unlicensed spectrum (e.g., an unlicensed electromagnetic spectrum band). For example, some radio access technologies (RATs), such as NR, may allow operation in unlicensed spectrum. The NR RAT for unlicensed spectrum may be referred to as NR-Unlicensed (NR-U). Not all sub-bands in unlicensed spectrum may be available at all times. For example, some sub-bands may be occupied by other UEs 120, base stations 120, or other wireless nodes.

Prior to gaining access to, and communicating over, unlicensed spectrum, a wireless device may perform a listen before talk (LBT) procedure to contend for access to the unlicensed spectrum. An LBT procedure, sometimes referred to as a clear channel assessment (CCA) procedure, may include performing the LBT procedure to determine whether a channel of the unlicensed spectrum is available. An LBT procedure may include detecting or sensing an energy level on the channel of the unlicensed spectrum and determining whether the energy level is below a threshold (e.g., a spectrum energy detection threshold). When the energy level is below the threshold, the LBT procedure is successful and contention to access the channel of the unlicensed spectrum may be successful. When the energy level exceeds the threshold, the LBT procedure is unsuccessful, and contention to access the channel of the unlicensed spectrum may be unsuccessful. Thus, coexistence between devices on non-centrally-scheduled channels, such as sidelink channels on the unlicensed spectrum, is enabled.

Example LBT categories include category one (Cat 1) LBT, category two (Cat 2) LBT, category three (Cat 3) LBT, and category four (Cat 4) LBT. In Cat 1 LBT, also referred to as no LBT, an LBT procedure is not performed prior to transmission of a communication on the channel. In Cat 2 LBT, the channel sensing duration is fixed (e.g., without random back-off). A 16 microsecond channel sensing duration is used for 16 microsecond Cat 2 LBT, and a 25 microsecond channel sensing duration is used for 25 microsecond Cat 2 LBT. In Cat 3 LBT, the channel sensing duration is fixed (e.g., a contention window has a fixed size), and random back-off is used. In Cat 4 LBT, the channel sensing duration is variable (e.g., a contention window has a variable size), and random back-off is used.

During a PRS exchange procedure, PRS transmission latency (e.g., a time between a transmission of a PRS from a first UE 120 and a transmission of a second PRS from a second UE 120) is a significant factor for the accuracy of the determination of a position of a UE 120 (e.g., using the PRS). A smaller PRS transmission latency results in a smaller clock drift, thereby resulting in a more accurate determination of a position of a UE 120. However, when deployed in an unlicensed spectrum, different UEs 120 may experience different channel access availabilities. This may result in a larger PRS transmission latency during the PRS exchange procedure.

Therefore, it may be beneficial to group UEs 120 for the purposes of performing group based PRS LBT procedures. For example, UEs 120 may be grouped with other UEs 120 that have similar channel access availabilities. A group may include an initiator UE 120 (e.g., that forms the group by broadcasting group formation communications) and one or more responder UEs 120 (e.g., that join the group based at least in part on responding to a group formation communication). Groups may be formed periodically (e.g., according to a group formation cycle). The initiator UE 120 may perform a Cat 4 LBT procedure that includes sensing the channel in the unlicensed spectrum and reserving a channel occupancy time (CoT) for all members of the group. A responder UE 120 may perform a Cat 2 LBT procedure during a time slot during the CoT (e.g., that was reserved for the responder UE 120 by the imitator UE 120) that includes a channel assessment in the unlicensed spectrum. The responder UE 120 may then broadcast a PRS after gaining access to the channel of the unlicensed spectrum. In this way, PRS transmission latency during a PRS exchange procedure deployed in the unlicensed spectrum may be reduced.

Some techniques and apparatuses described herein enable dynamic group formation for group based PRS LBT procedures. For example, a responder UE 120 may perform a group PRS LBT procedure. The responder UE 120 may determine that the responder UE 120 should not be associated with the group based at least in part on performing the group PRS LBT procedure (e.g., based at least in part on measuring a local interference level during the group PRS LBT procedure). The responder UE 120 may indicate to the initiator UE 120 that the responder UE 120 should be removed from the group. The initiator UE 120 may remove the responder UE 120 from the group and update a list of the group members for upcoming PRS exchanges. As a result, a responder UE 120 that experiences local interference affecting the channel access availability of the responder UE 120 may voluntarily opt out of a group before the end of a group formation cycle. This improves the reliability and accuracy of the PRS exchange procedure as the responder UE 120 will not attempt to perform the LBT procedure and transmit a PRS when the responder UE 120 is unable to access the channel of the unlicensed spectrum. Moreover, this improves the efficiency of a Cat 4 LBT procedure performed by an initiator UE 120 as the initiator UE 120 will not reserve CoT for the responder UE 120 that cannot access the channel and/or transmit during the CoT. Additionally, the likelihood of an LBT failure (e.g., due to local interference) by the responder UE 120 is decreased.

As shown by reference number 340, the first UE and/or the plurality of second UEs may determine positioning information using the PRSs. For example, the first UE may determine, based at least in part on a transmission time associated with a PRS transmitted by a second UE and a time at which the PRS is received, a distance between the first UE and the second UE. In some aspects, the positioning information may indicate a location of a UE (e.g., a geographical location of the first UE, such as an absolute initial location of the UE at the pre-PRS stage), an orientation of the UE (e.g., an absolute initial orientation of the UE, such as one or more offsets relative to a reference orientation), an antenna panel identifier that indicates an antenna panel used to transmit or receive a PRS, a gain pattern for an antenna panel (e.g., left facing, right facing, front, back, etc.), one or more time stamps associated with one or more received PRSs (e.g., indicating times at which the one or more PRSs are received based at least in part on a clock of the UE), one or more signal strengths associated with the one or more received PRSs, one or more time stamps associated with one or more transmitted PRSs (e.g., indicating times at which the one or more PRSs are transmitted based at least in part on a clock of the UE), a time of departure of a transmitted PRS, a time of arrival of a received PRS, and/or the like.

As shown by reference number 345, the first UE and the plurality of second UEs may broadcast the positioning information. The determination and broadcasting of the positioning information may be referred to as a post-PRS stage of the UE positioning session. In some aspects, the positioning information may be broadcast in a message referred to herein as a post-PRS message. The post-PRS message may indicate at least part of the positioning information determined in connection with reference number 340. For example, the post-PRS message may indicate a location of a first UE (e.g., a location at a time at which a PRS is broadcasted, multiple locations corresponding to times at which multiple PRSs are broadcasted, a trajectory of the first UE while multiple PRSs are broadcasted).

In some aspects, the first UE or a second UE may broadcast a post-PRS message after all PRSs have been transmitted by the first UE and the plurality of second UEs. In some aspects, the first UE or a second UE may broadcast a post-PRS message after a group of PRSs have been transmitted by the first UE and the plurality of second UEs. For example, if the first UE and the plurality of second UEs are to transmit multiple groups of PRSs, the first UE or a second UE may broadcast a post-PRS message after each group of PRSs. Transmitting the post-PRS messages after all PRSs have been transmitted may conserve signaling resources and reduce overhead, while transmitting the post-PRS messages after each group of PRSs may provide more detailed information and may enable synchronization and ranging as the PRSs are transmitted.

In some aspects, the first UE or a second UE may select a time for broadcasting a post-PRS message. In some aspects, the first UE or a second UE may broadcast a post-PRS message in accordance with a pre-PRS message or a parameter associated with a UE positioning session. In some aspects, the first UE and the plurality of second UEs may transmit the plurality of post-PRS messages in a same order as corresponding PRS messages. For example, if the PRS messages are transmitted by a first UE, then a second UE, then a third UE, then the post-PRS messages may be transmitted by the first UE, then the second UE, then the third UE.

As shown by reference number 350, in some aspects, the first UE (or one or more second UEs) may perform a synchronization operation. For example, the first UE may synchronize a communication operation, a clock, or another function with a second UE. The first UE may perform this synchronization based at least in part on the set of parameters for the UE positioning session and based at least in part on the PRSs. For example, the first UE may determine a difference between a time at which a PRS is received and a time at which the PRS is expected to be received (e.g., based at least in part on a distance between the first UE and a transmitter of the PRS and based at least in part on a time at which the PRS is transmitted), and may synchronize with the transmitter of the PRS accordingly.

As shown by reference number 355, in some aspects, the first UE (or one or more second UEs) may determine ranging information based at least in part on the UE positioning session. For example, the first UE may determine a range relative to one or more second UEs based at least in part on respective positioning information of the first UE and the one or more second UEs. More particularly, the first UE may determine the ranging information based at least in part on a time at which a PRS was transmitted and a time at which the PRS is received. In some aspects, the first UE may determine a location of the first UE, and/or of a second UE, based at least in part on the positioning information. For example, the first UE may triangulate a location, may determine a location based at least in part on a previously known location and a trajectory, or may perform a similar operation. In some aspects, the first UE and/or one or more second UEs may communicate ranging information. For example, the first UE and/or one or more second UEs may transmit ranging information to each other (e.g., via broadcast or another form of transmission). In some aspects, the first UE and/or one or more second UEs may confirm or verify a determined range and/or location based at least in part on the ranging information shared by another UE, thereby improving accuracy of determination of ranges and/or locations.

As indicated above, FIG. 3 is provided as an example. Other examples may differ from what is described with regard to FIG. 3.

Figure 4:
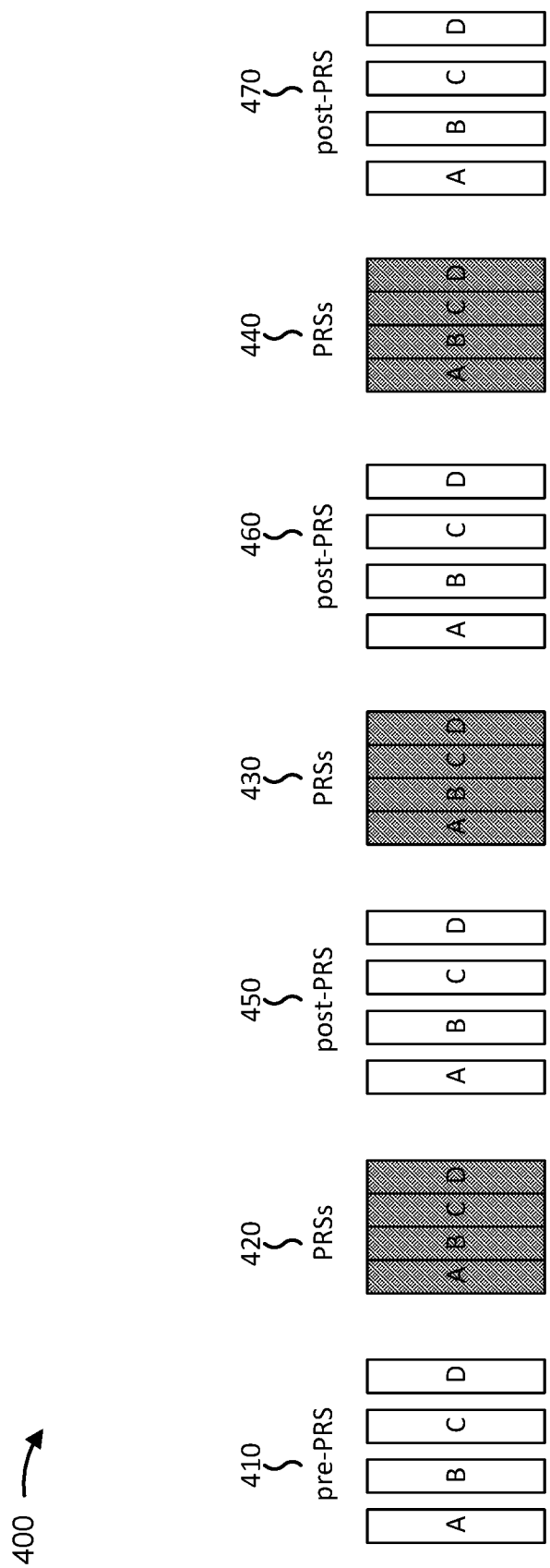
FIGS. 4 and 5 are diagrams illustrating examples of transmission times associated with pre-PRS messages, PRS messages, and post-PRS messages, in accordance with various aspects of the present disclosure.
Figure 5:
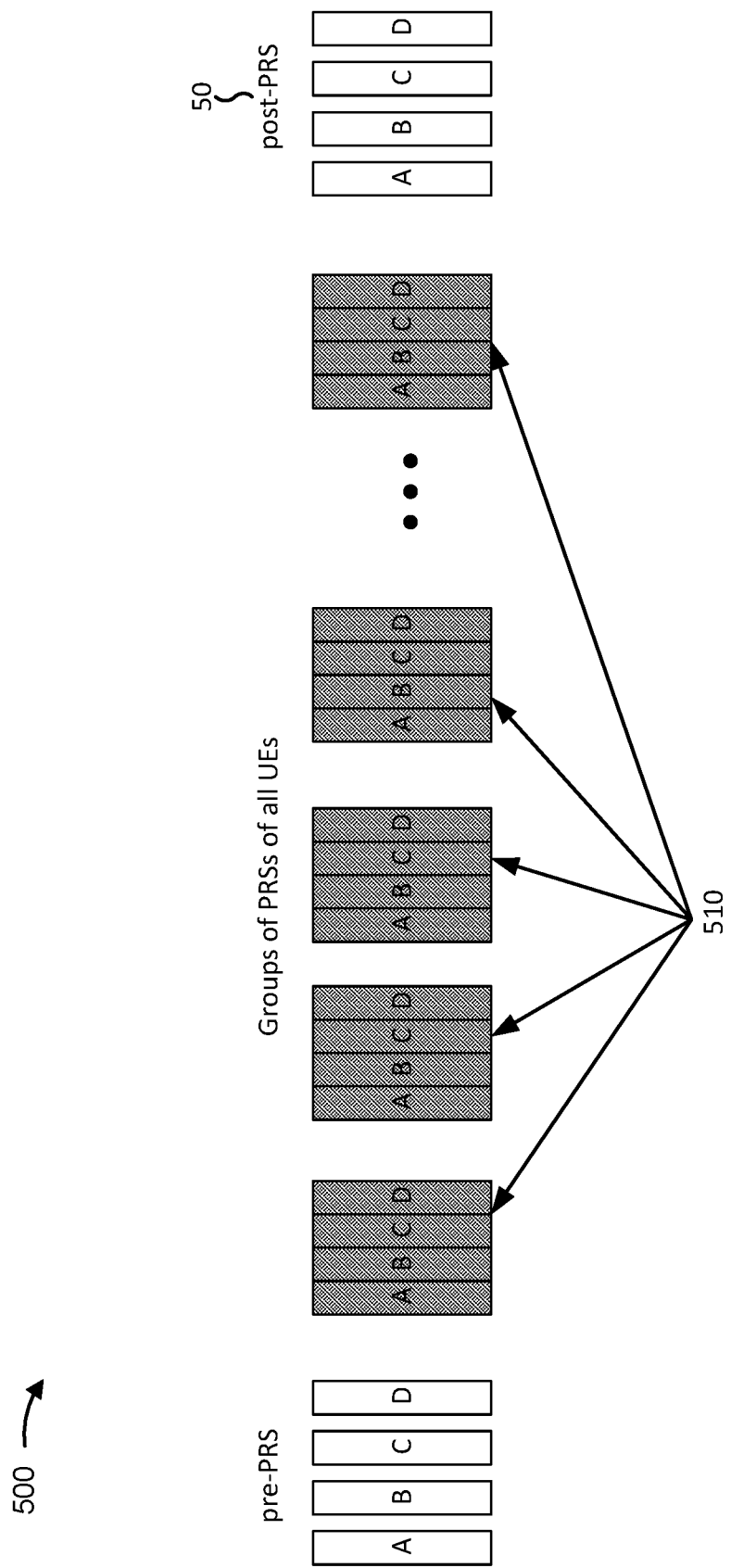

FIGS. 4 and 5 are diagrams illustrating examples 400 and 500, respectively, of transmission times associated with pre-PRS messages, PRS messages, and post-PRS messages, in accordance with various aspects of the present disclosure. FIGS. 4 and 5 show examples wherein four UEs (e.g., UEs 120) perform a UE positioning session: a UE A (represented by "A"), a UE B (represented by "B"), a UE C (represented by "C"), and a UE D (represented by "D").

In example 400 of FIG. 4, the UEs A, B, C, and D perform a pre-PRS stage, shown by reference number 410, by transmitting pre-PRS messages to each other. The pre-PRS messages are shown, for example, by reference numbers 320, 325, and 330 of FIG. 3. Furthermore, the UEs A, B, C, and D transmit multiple groups of PRSs, shown by reference numbers 420, 430, and 440. In example 400, after each group of PRSs, the UEs A, B, C, and D transmit respective post-PRS messages, shown by reference number 450, 460, and 470. Thus, by performing multiple PRS stages and post-PRS stages based at least in part on a single pre-PRS stage, the UEs A, B, C, and D conserve power and communication resources.

In example 500 of FIG. 5, the UEs A, B, C, and D perform a pre-PRS stage. Subsequently, the UEs A, B, C, and D transmit multiple groups of PRSs, shown by reference number 510. A group of PRSs may also be referred to as a cycle of PRSs. After transmitting all configured groups of PRSs (e.g., in accordance with parameters indicated in the pre-PRS stage), the UEs A, B, C, and D may transmit post-PRS messages, as shown by reference number 520. Thus, the UEs A, B, C, and D may conserve power and communication resources relative to performing a pre-PRS stage and/or a post-PRS stage for each group of PRSs.

As indicated above, FIGS. 4 and 5 are provided as one or more examples. Other examples may differ from what is described with regard to FIGS. 4 and 5.

Figure 6:
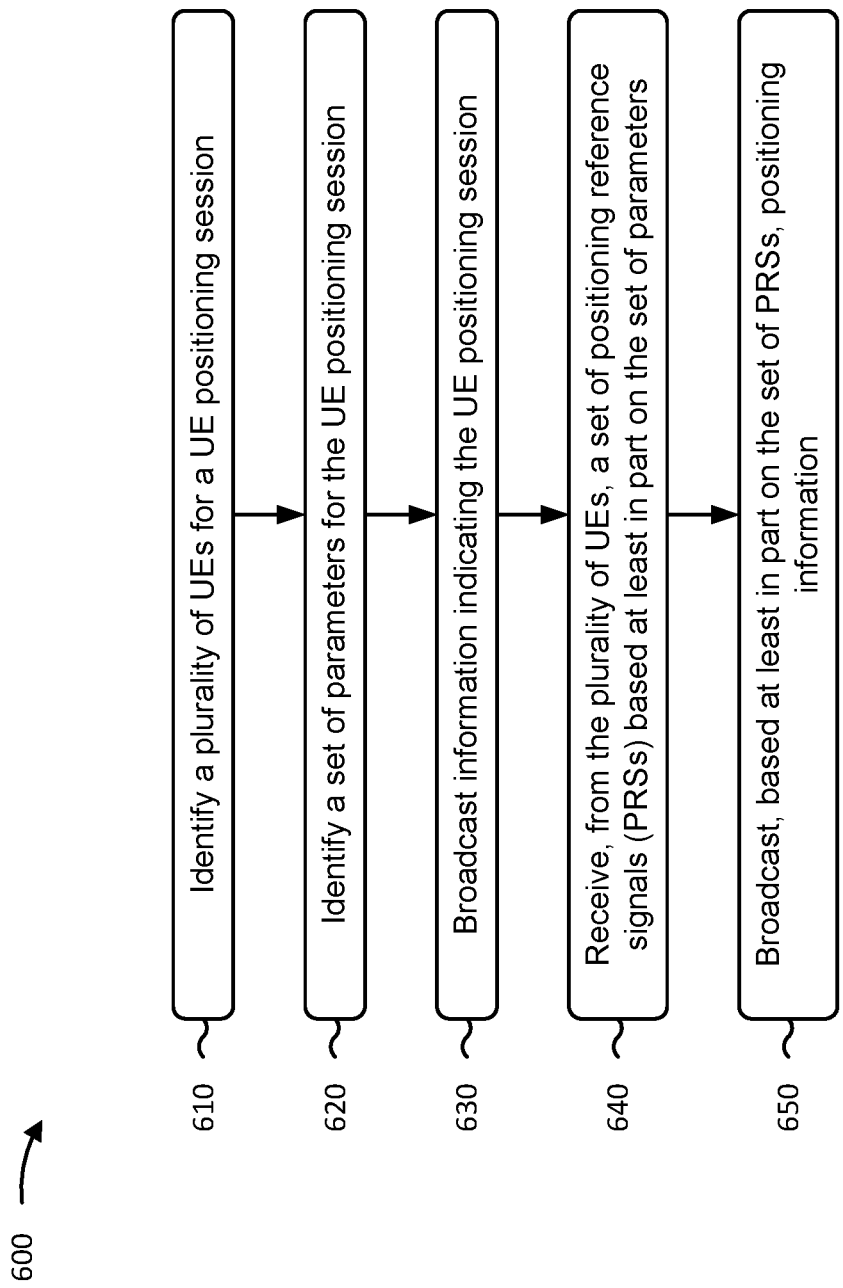
FIGS. 6 and 7 are diagrams illustrating example processes associated with positioning reference signaling, in accordance with various aspects of the present disclosure.

FIG. 6 is a diagram illustrating an example process 600 performed, for example, by a first UE, in accordance with various aspects of the present disclosure. Example process 600 is an example where the first UE (e.g., UE 120) performs operations associated with techniques for ranging and positioning of distributed devices.

As shown in FIG. 6, in some aspects, process 600 may include identifying a plurality of UEs for a UE positioning session (block 610). For example, the first UE (e.g., using identification component 1208, depicted in FIG. 12) may identify a plurality of UEs for a UE positioning session, as described above.

As further shown in FIG. 6, in some aspects, process 600 may include identifying a set of parameters for the UE positioning session (block 620). For example, the first UE (e.g., using identification component 1208, depicted in FIG. 12) may identify a set of parameters for the UE positioning session, as described above.

As further shown in FIG. 6, in some aspects, process 600 may include broadcasting information indicating the UE positioning session (block 630). For example, the first UE (e.g., using transmission component 1204, depicted in FIG. 12) may broadcast information indicating the UE positioning session, as described above.

As further shown in FIG. 6, in some aspects, process 600 may include receiving, from the plurality of UEs, a set of positioning reference signals (PRSs) based at least in part on the set of parameters (block 640). For example, the first UE (e.g., using reception component 1202, depicted in FIG. 12) may receive, from the plurality of UEs, a set of positioning reference signals (PRSs) based at least in part on the set of parameters, as described above.

As further shown in FIG. 6, in some aspects, process 600 may include broadcasting, based at least in part on the set of PRSs, positioning information (block 650). For example, the first UE (e.g., using transmission component 1204, depicted in FIG. 12) may broadcast, based at least in part on the set of PRSs, positioning information, as described above.

Process 600 may include additional aspects, such as any single aspect or any combination of aspects described below and/or in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
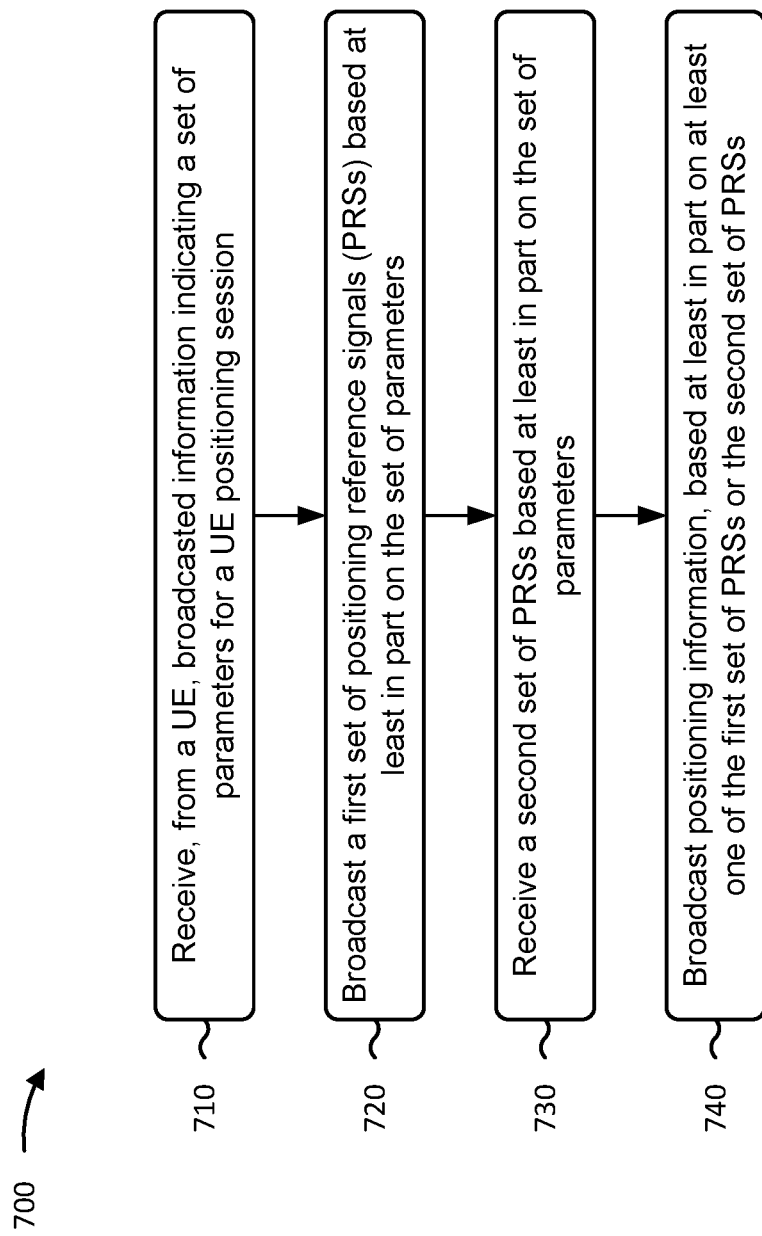

FIG. 7 is a diagram illustrating an example process 700 performed, for example, by a first UE, in accordance with various aspects of the present disclosure. Example process 700 is an example where the first UE (e.g., UE 120) performs operations associated with techniques for ranging and positioning of distributed devices.

As shown in FIG. 7, in some aspects, process 700 may include receiving, from a second UE, broadcasted information indicating a set of parameters for a UE positioning session (block 710). For example, the first UE (e.g., using reception component 1202, depicted in FIG. 12) may receive, from a second UE, broadcasted information indicating a set of parameters for a UE positioning session, as described above.

As further shown in FIG. 7, in some aspects, process 700 may include broadcasting a first set of positioning reference signals (PRSs) based at least in part on the set of parameters (block 720). For example, the first UE (e.g., using transmission component 1204, depicted in FIG. 12) may broadcast a first set of positioning reference signals (PRSs) based at least in part on the set of parameters, as described above.

As further shown in FIG. 7, in some aspects, process 700 may include receiving a second set of PRSs based at least in part on the set of parameters (block 730). For example, the first UE (e.g., using reception component 1202, depicted in FIG. 12) may receive a second set of PRSs based at least in part on the set of parameters, as described above.

As further shown in FIG. 7, in some aspects, process 700 may include broadcasting positioning information, based at least in part on at least one of the first set of PRSs or the second set of PRSs (block 740). For example, the first UE (e.g., using transmission component 1204, depicted in FIG. 12) may broadcast positioning information, based at least in part on at least one of the first set of PRSs or the second set of PRSs, as described above.

Process 700 may include additional aspects, such as any single aspect or any combination of aspects described below and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
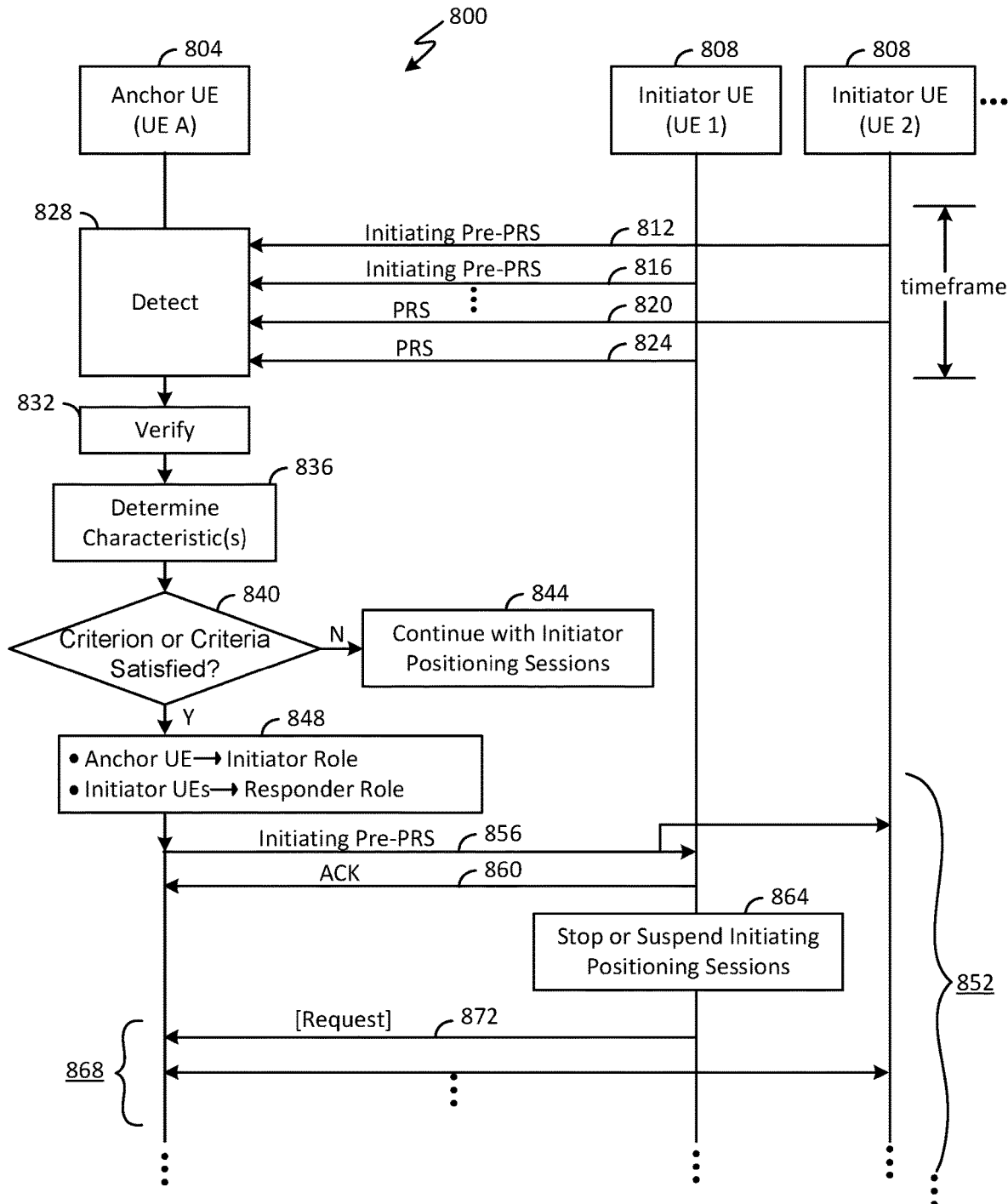
FIG. 8 is a diagram illustrating an example of UE positioning sessions for a group of UEs, in accordance with various aspects of the present disclosure.
Figure 8:
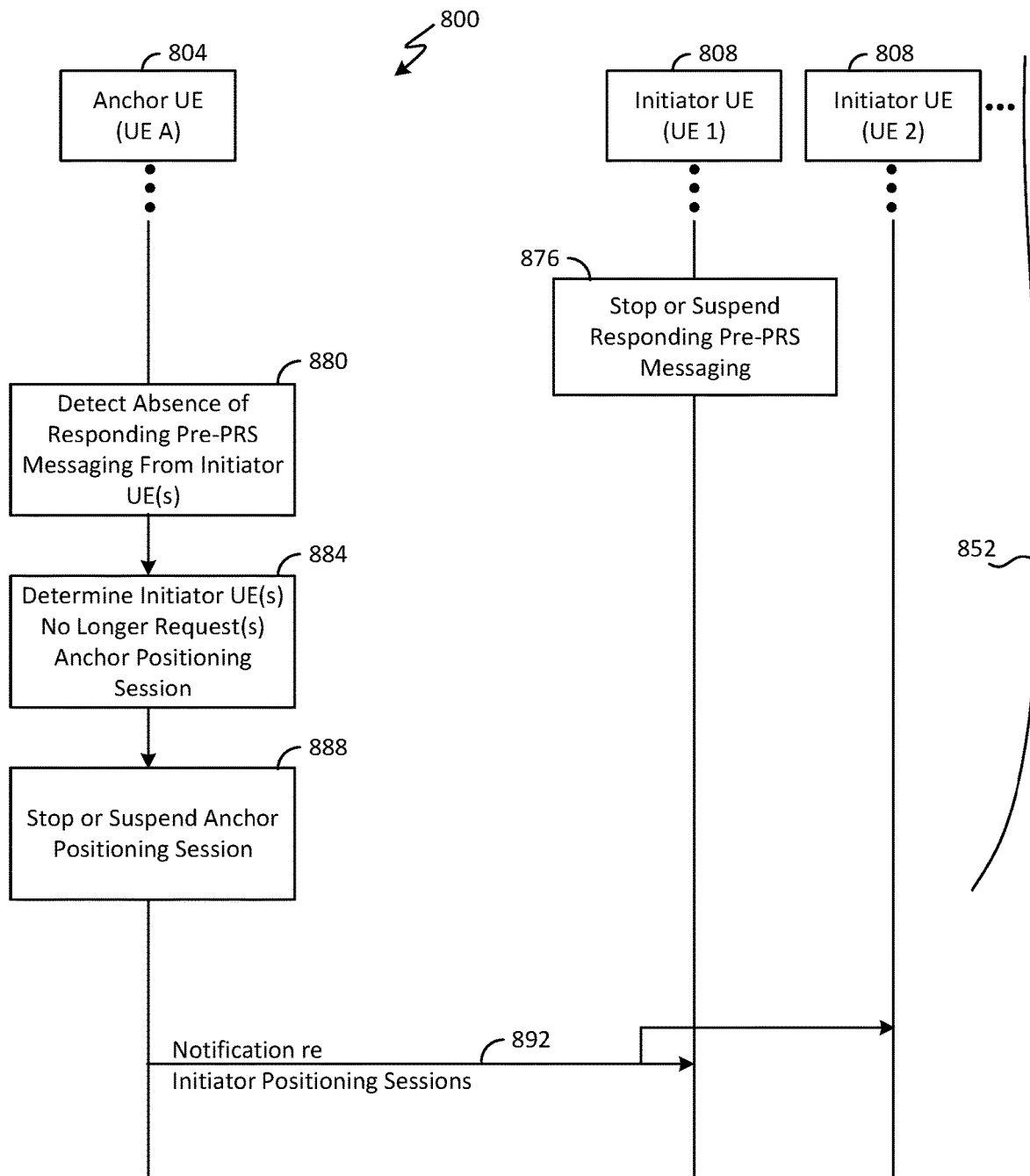

FIG. 8 is a diagram illustrating an example of UE positioning sessions for a group of UEs, in accordance with various aspects of the present disclosure. As shown in FIG. 8, UE positioning sessions 800 include an anchor UE 804, referred to as UE A in this example, and two or more initiator UEs 808 including UE 1 and UE 2 in this example. In some aspects, the communications between UEs of FIG. 8 may be performed via a sidelink interface, such as a PC5 interface or a similar interface, as with the example of FIG. 3 described herein.

In FIG. 8, initiator UEs 808 including UE 1 and UE 2 can broadcast respective initiator PRS transmissions including initiating pre-PRS messages 812 and 816. Each pre-PRS message 812 or 816 is associated with a respective initiator positioning session. For instance, UE 1 initiates a first positioning session by broadcasting pre-PRS message 812, and UE 2 initiates a second positioning session by broadcasting pre-PRS message 816.

In FIG. 8, as part of the first positioning session, UE 1 also broadcasts a PRS message 820 following UE 1's pre-PRS stage. As part of the second positioning session, UE 2 broadcasts a PRS message 824 after UE 2's pre-PRS stage. It should be appreciated that initiator UEs 808 often are not coordinated, so the timings between pre-PRS messages from initiator UEs 808 can vary with respect to a pre-configured PRS periodicity. For instance, autonomous initiator UEs 808 could transmit pre-PRS messages at any time during a one hundred millisecond pre-PRS broadcast window.

In FIG. 8, as shown at 828, UE A is configured to listen for and detect pre-PRS messages 812 and 816 as well as PRS messages 820 and 824 over a designated timeframe such as a duration of one or several seconds. At 832, UE A is configured to verify that UE 1 and UE 2 are conducting the respective initiator positioning sessions. In some implementations, the verification is achieved by at least detecting a PRS message associated with a previously detected pre-PRS message from the same initiator UE. For instance, UE 1's initiator positioning session can be verified by detecting PRS message 824 linked with pre-PRS message 816 as part of the same initiator positioning session. In some implementations, verification is not achieved unless the PRS message(s) associated with earlier pre-PRS message(s) in the same positioning session are received within the designated timeframe. It should be appreciated that a designated timeframe such as 'X' seconds can be an environmental parameter to be configured depending on the desired implementations. For instance, 'X' can be set to have a smaller value in environments where network dynamics change quickly, or 'X' can be larger in environments where network dynamics change relatively slowly.

In FIG. 8, at 836, UE A is configured to determine, based on the initiator PRS transmissions, one or more characteristics of PRS messaging associated with the initiator positioning sessions of initiator UEs 808 in this example. For instance, when UE A listens for pre-PRS messages over a designated timeframe, a count of the initiator UEs sending the pre-PRS messages can be identified. In one example, initiator UEs 808 include four initiator UEs including UE 1 and UE 2. These four initiator UEs are identified at 828. Thus, a characteristic of PRS messaging at 836 in this example can be the count of four initiator UEs. In some implementations, the designated timeframe also or alternatively is a characteristic of the PRS messaging determined at 836.

In FIG. 8, at 840, UE A is configured to determine whether the one or more characteristics of 836 satisfies a criterion or criteria. For instance, it can be determined at 840 whether the count of initiator UEs identified over the designated timeframe at 836 is greater than or equal to a designated threshold. In the example of FIG. 8, if the count of four initiator UEs does not meet or exceed the threshold, at 844, initiator positioning sessions initiated by the initiator UEs can continue. Alternatively, at 840, if the count of initiator UEs meets or exceeds the threshold, at 848, UE A takes on the initiator role. Thus, PRS transmissions from UE A following 848 can indicate to initiator UEs 808 including UE 1 and UE 2 to take on responder roles in a new UE A-driven positioning session also referred to herein as an anchor positioning session, indicated by reference number 852 in the example of FIG. 8. In some implementations, at 848, UE A stores, in a local memory device, data identifying UE A as having the initiator role. In some instances, the data stored in the local memory device also identifies initiator UEs 808 including UE 1 and UE 2 as having the responder role for anchor positioning session 852.

In FIG. 8, following 848, UE A is configured to broadcast to initiator UEs 808 an anchor PRS transmission indicating that UE A is initiating anchor positioning session 852. In some implementations, as in the example of FIG. 8, the anchor PRS transmission includes an initiating pre-PRS message 856, which can serve as or include an instruction to UEs 808 to stop or suspend initiation of positioning sessions until further notice. Upon receiving such an initiating pre-PRS message 856, initiator UEs 808 such as UE 1 are configured to send an acknowledgement message 860 back to UE A to confirm receipt of pre-PRS message 856. In FIG. 8, UE 1 is configured to follow the instruction to stop or suspend the initiation of positioning sessions at 864.

In FIG. 8, following UE 1's stopping or suspending of the initiation of positioning sessions, pre-PRS messaging 868 between UE A and UE 1 is conducted, where UE 1 broadcasts one or more responding pre-PRS messages as part of anchor positioning session 852. In some implementations, such pre-PRS messaging 868 includes a request message 872 from UE 1 to UE A, where request message 872 provides a confirmation that UE 1 requests to participate as a responder as part of anchor positioning session 852, with UE A operating as the initiator. For instance, one or more bits in request message 872 can be set to indicate the request to participate as a responder.

In FIG. 8, as pre-PRS messaging 868 is carried out between UE A and UE 1, at some point, UE 1 may stop or suspend sending responding pre-PRS messages back to UE A at 876 to indicate that UE 1 no longer requests to participate in anchor positioning session 852. In some other implementations, UE 1 can send an affirmative message indicating that UE 1 no longer requests to participate in anchor positioning session 852. UE A is configured to monitor pre-PRS messaging 868 and thus detect, at 880, the absence of responding pre-PRS messaging from UE 1. Thus, at 884, UE A can determine, from the absence of pre-PRS messaging from any of initiator UEs 808, that an initiator UE such as UE 1 is no longer requesting anchor positioning session 852. Following such a determination, at 888, UE A can stop or suspend anchor positioning session 852. In some implementations, after stopping or suspending anchor positioning session 852, UE A broadcasts a notification message 892 to initiator UEs 808 indicating that UE A is relinquishing control of initiating positioning sessions, that is, indicating that initiator UEs 808 can commence with initiating new positioning sessions. Following 892, as described herein, UE 1 or UE 2 can then initiate a positioning session by broadcasting a pre-PRS message.

Figure 9:
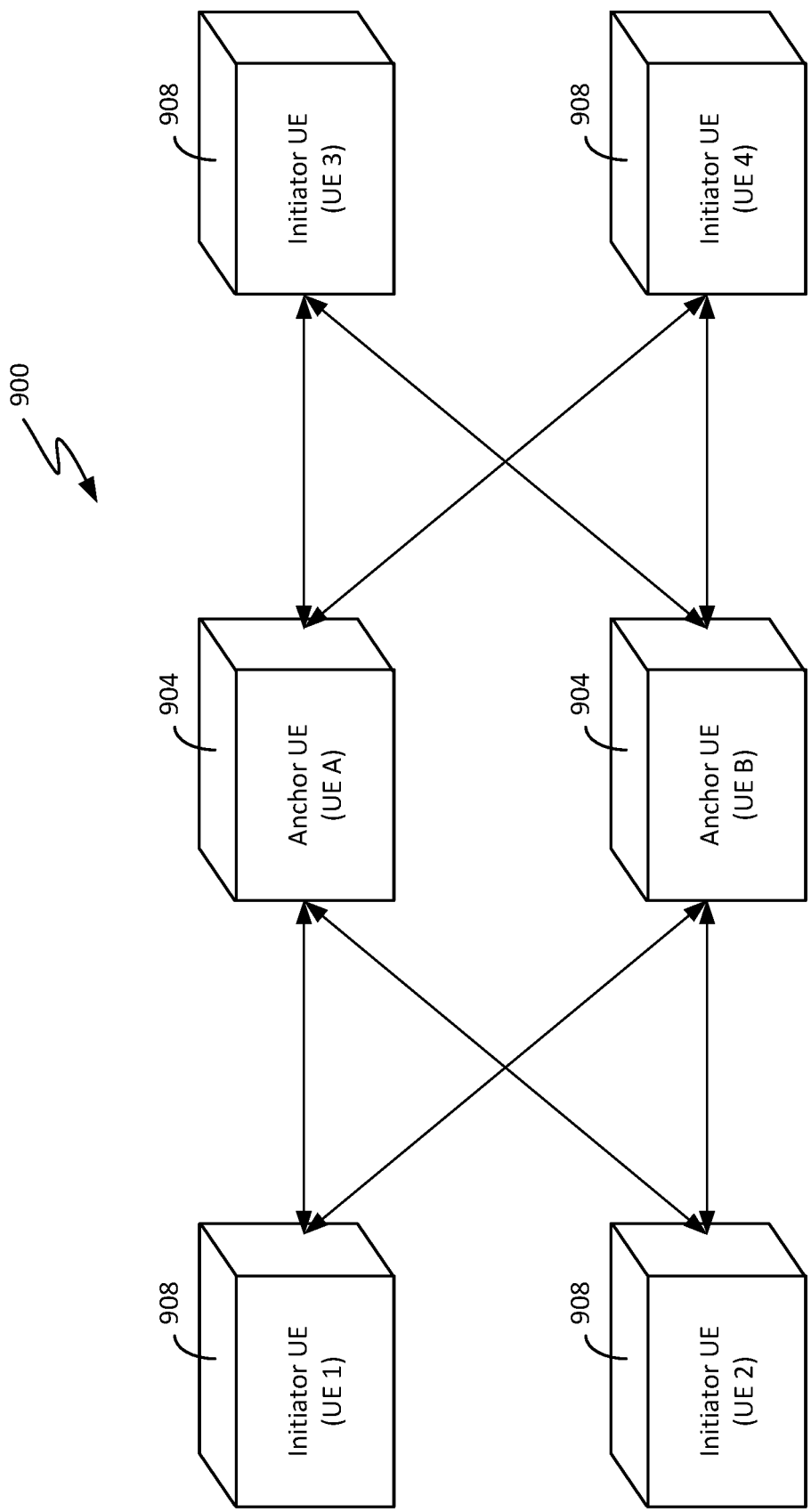
FIG. 9 is a diagram illustrating a group of UEs including at least two anchor UEs for performing UE positioning sessions, in accordance with various aspects of the present disclosure.

FIG. 9 is a diagram illustrating a group of UEs including at least two anchor UEs for performing UE positioning sessions, in accordance with various aspects of the present disclosure. FIG. 9 shows a variation to the example of FIG. 8, namely the inclusion of two anchor UEs 904, referred to in this example as UE A and UE B, rather than one anchor UE in FIG. 8. In the example of FIG. 9, the timing of pre-PRS broadcasts can be randomized to coordinate between UE A and UE B. In FIG. 9, there are at least four initiator UEs 908, referred to in this example as UE 1, UE 2, UE 3 and UE 4.

In the example of FIG. 9, each of UE A and UE B is configured to monitor and detect pre-PRS messages and PRS messages from initiator UEs 908, as described above at 828 of FIG. 8. In FIG. 9, however, UE A is configured to decode pre-PRS messages from initiator UEs 908 and determine, based on the decoded pre-PRS messaging, whether the other anchor UE, UE B in this example, is visible to initiator UEs 908. When UE B has not been detected by initiator UEs 908, UE A is configured to initiate an anchor positioning session by broadcasting an initiating pre-PRS message as described above at 856 of FIG. 8. When UE A broadcasts the initiating pre-PRS message, UE A treats UE B as a responder for the anchor positioning session. On the other hand, when UE B is visible to initiator UEs 908, UE A can be configured to refrain from initiating an anchor positioning session and instead operate as a responder for an anchor positioning session initiated by UE B.

Figure 10:
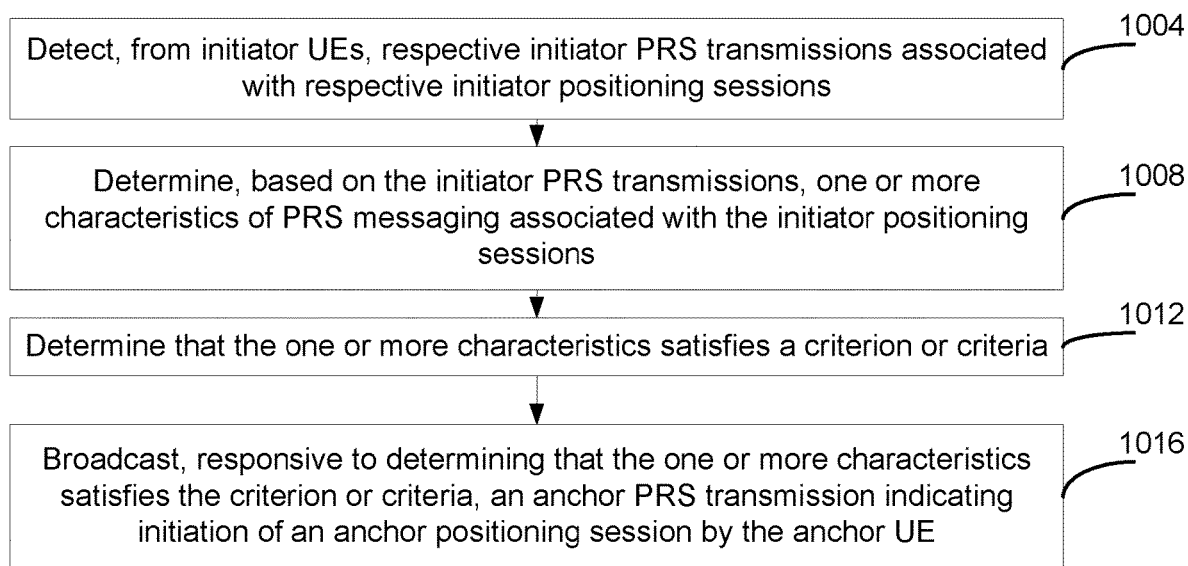
FIG. 10 is a diagram illustrating an example process associated with UE position reference signaling, in accordance with various aspects of the present disclosure.

FIG. 10 is a diagram illustrating an example process associated with UE position reference signaling, in accordance with various aspects of the present disclosure. The example process of FIG. 10 can be performed by an anchor UE, where the anchor UE performs operations associated with techniques for ranging and positioning of distributed devices. Means for performing the functionality of the process of FIG. 10 may include hardware and/or software components of a mobile device (e.g., apparatus illustrated in FIG. 12).

As shown in FIG. 10, in some aspects, the process may include at 1004 detecting, from initiator UEs, respective initiator PRS transmissions associated with respective initiator positioning sessions. Means for performing functionality at 1004 may comprise a bus, wireless communication interface, digital signal processor (DSP), processor(s), memory, and/or other components as described herein with reference to FIGS. 2 and 12. Such an initiator PRS transmission can include a pre-PRS message.

As further shown in FIG. 10, in some aspects, the process may include at 1008 determining, based on the initiator PRS transmissions, one or more characteristics of PRS messaging associated with the initiator positioning sessions. Means for performing functionality at 1008 may comprise a bus, wireless communication interface, digital signal processor (DSP), processor(s), memory, and/or other components as described herein with reference to FIGS. 2 and 12. For instance, the anchor UE can be configured to listen for and detect pre-PRS messages over a designated timeframe such as a duration of one or several seconds. It should be appreciated that a designated timeframe such as 'X' seconds can be an environmental parameter to be configured depending on the desired implementations. For instance, 'X' can be set to have a smaller value in environments where network dynamics change quickly, or 'X' can be larger in environments where network dynamics change relatively slowly. In one example, there are four initiator UEs identified at 1008. Thus, a characteristic of PRS messaging in this example can be the count of four initiator UEs. In some implementations, the designated timeframe also or alternatively is a characteristic of the PRS messaging determined at 1008.

As further shown in FIG. 10, in some aspects, the process may include at 1012 determining that the one or more characteristics satisfies a criterion or criteria. Means for performing functionality at 1012 may comprise a bus, wireless communication interface, digital signal processor (DSP), processor(s), memory, and/or other components as described herein with reference to FIGS. 2 and 12. For instance, it can be determined that the count of initiator UEs identified over the designated timeframe at 1008 traverses a designated threshold. Satisfaction of a criterion at 1012 can trigger the anchor UE to be identified as having an initiator role for an anchor positioning session, while one or more of the initiator UEs can be identified as having a responder role for such a session. Thus, PRS transmissions from the anchor UE following 1012 can indicate to initiator UEs to take on responder roles in an anchor UE-driven positioning session.

As further shown in FIG. 10, in some aspects, the process may include at 1016 broadcasting, responsive to determining that the one or more characteristics satisfies the criterion or criteria, an anchor PRS transmission indicating initiation of an anchor positioning session by the anchor UE. Means for performing functionality at 1016 may comprise a bus, wireless communication interface, digital signal processor (DSP), processor(s), memory, and/or other components as described herein with reference to FIGS. 2 and 12. For instance, the anchor PRS transmission can include a pre-PRS message. The anchor PRS transmission can include an instruction to a recipient UE to stop or suspend initiation of positioning sessions until further notice.

Following the initiator UE's stopping or suspending of the initiation of positioning sessions, pre-PRS messaging between the anchor UE and the initiator UE can be conducted, where the initiator UE broadcasts one or more responding pre-PRS messages as part of the anchor positioning session. In some implementations, such pre-PRS messaging includes a request message from the initiator UE, where the request message provides a confirmation that the initiator UE requests to participate as a responder as part of the anchor positioning session. For instance, one or more bits in the request message can be set to indicate the request to participate as a responder. In such examples, the initiator UE can stop or suspend the sending of the one or more responding pre-PRS messages to indicate that the initiator UE no longer requests the anchor positioning session.

As pre-PRS messaging is carried out between the anchor UE and the initiator UE, at some point, the initiator UE may stop or suspend sending responding pre-PRS messages back to the anchor UE to indicate that the initiator UE no longer requests to participate in the anchor positioning session. In some other implementations, the initiator UE can send an affirmative message indicating that the initiator UE no longer requests to participate in the anchor positioning session. The anchor UE is configured to monitor pre-PRS messaging and thus detect the absence of responding pre-PRS messaging from the initiator UE. Thus, the anchor UE can determine, from the absence of pre-PRS messaging from initiator UEs, that the initiator UE is no longer requesting the anchor positioning session. Following such a determination, the anchor UE can stop or suspend the anchor positioning session. In some implementations, after stopping or suspending the anchor positioning session, the anchor UE broadcasts a notification message to initiator UEs indicating that the anchor UE is relinquishing control of initiating positioning sessions, that is, indicating that the initiator UEs can commence with initiating new positioning sessions.

The process of FIG. 10 may include additional aspects, such as any single aspect or any combination of aspects described below and/or in connection with one or more other processes described elsewhere herein.

Although FIG. 10 shows example blocks of a process, in some aspects, the process of FIG. 10 may include additional blocks, fewer blocks, different blocks, or differently arranged blocks than those depicted in FIG. 10. Additionally, or alternatively, two or more of the blocks of the process of FIG. 10 may be performed in parallel.

Figure 11:
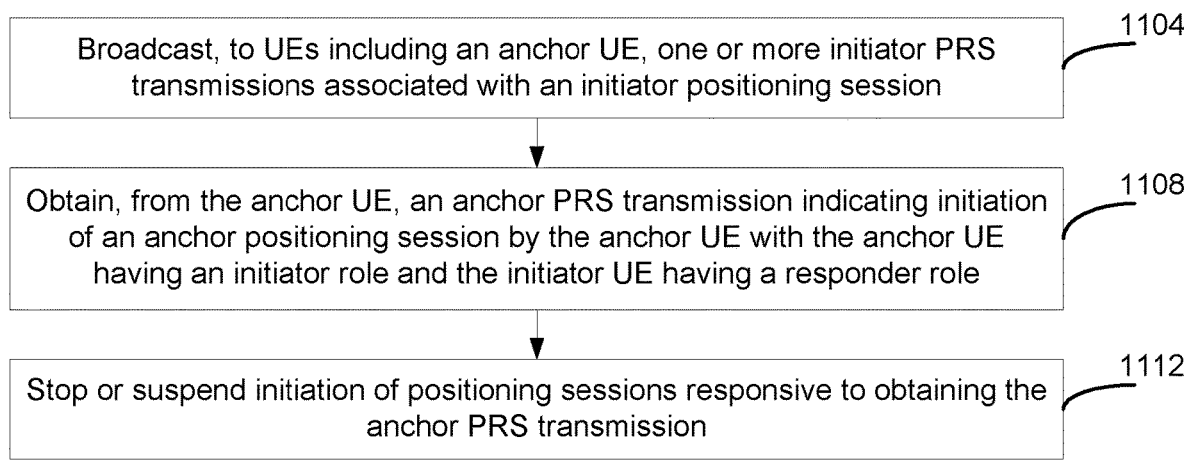
FIG. 11 is a diagram illustrating an example process associated with UE position reference signaling, in accordance with various aspects of the present disclosure.

FIG. 11 is a diagram illustrating an example process associated with UE position reference signaling, in accordance with various aspects of the present disclosure. The example process of FIG. 11 can be performed by an initiator UE, where the initiator UE performs operations associated with techniques for ranging and positioning of distributed devices. Means for performing the functionality of the process of FIG. 11 may include hardware and/or software components of a mobile device (e.g., apparatus illustrated in FIG. 12).

As shown in FIG. 11, in some aspects, the process may include at 1104 broadcasting, to UEs including an anchor UE, one or more initiator PRS transmissions associated with an initiator positioning session. Means for performing functionality at 1104 may comprise a bus, wireless communication interface, digital signal processor (DSP), processor(s), memory, and/or other components as described herein with reference to FIGS. 2 and 12. For instance, an initiator PRS transmission can include a pre-PRS message. The anchor UE can be configured to listen for and detect pre-PRS messages over a designated timeframe such as a duration of one or several seconds. It should be appreciated that a designated timeframe such as 'X' seconds can be an environmental parameter to be configured depending on the desired implementations. For instance, 'X' can be set to have a smaller value in environments where network dynamics change quickly, or 'X' can be larger in environments where network dynamics change relatively slowly.

As further shown in FIG. 11, in some aspects, the process may include at 1108 obtaining, from the anchor UE, an anchor PRS transmission indicating initiation of an anchor positioning session by the anchor UE. Means for performing functionality at 1108 may comprise a bus, wireless communication interface, digital signal processor (DSP), processor(s), memory, and/or other components as described herein with reference to FIGS. 2 and 12. In the anchor positioning session, the anchor UE has an initiator role, and the initiator UE has a responder role. In some examples, such an anchor PRS transmission can include a pre-PRS message.

As further shown in FIG. 11, in some aspects, the process may include at 1112 stopping or suspending initiation of positioning sessions responsive to obtaining the anchor PRS transmission. Means for performing functionality at 1112 may comprise a bus, wireless communication interface, digital signal processor (DSP), processor(s), memory, and/or other components as described herein with reference to FIGS. 2 and 12. Following the initiator UE's stopping or suspending of the initiation of positioning sessions, pre-PRS messaging between the anchor UE and the initiator UE can be conducted, where the initiator UE broadcasts one or more responding pre-PRS messages as part of the anchor positioning session. In some implementations, such pre-PRS messaging includes a request message from the initiator UE, where the request message provides a confirmation that the initiator UE requests to participate as a responder as part of the anchor positioning session. For instance, one or more bits in the request message can be set to indicate the request to participate as a responder. In such examples, the initiator UE can stop or suspend the sending of the one or more responding pre-PRS messages to indicate that the initiator UE no longer requests the anchor positioning session.

As pre-PRS messaging is carried out between the anchor UE and the initiator UE, at some point, the initiator UE may stop or suspend sending responding pre-PRS messages back to the anchor UE to indicate that the initiator UE no longer requests to participate in the anchor positioning session. In some other implementations, the initiator UE can send an affirmative message indicating that the initiator UE no longer requests to participate in the anchor positioning session. The anchor UE is configured to monitor pre-PRS messaging and thus detect the absence of responding pre-PRS messaging from the initiator UE. Thus, the anchor UE can determine, from the absence of pre-PRS messaging from initiator UEs, that the initiator UE is no longer requesting the anchor positioning session. Following such a determination, the anchor UE can stop or suspend the anchor positioning session. In some implementations, after stopping or suspending the anchor positioning session, the anchor UE broadcasts a notification message to initiator UEs indicating that the anchor UE is relinquishing control of initiating positioning sessions, that is, indicating that the initiator UEs can commence with initiating new positioning sessions.

The process of FIG. 11 may include additional aspects, such as any single aspect or any combination of aspects described below and/or in connection with one or more other processes described elsewhere herein.

Although FIG. 11 shows example blocks of a process, in some aspects, the process of FIG. 11 may include additional blocks, fewer blocks, different blocks, or differently arranged blocks than those depicted in FIG. 11. Additionally, or alternatively, two or more of the blocks of the process of FIG. 11 may be performed in parallel.

Figure 12:
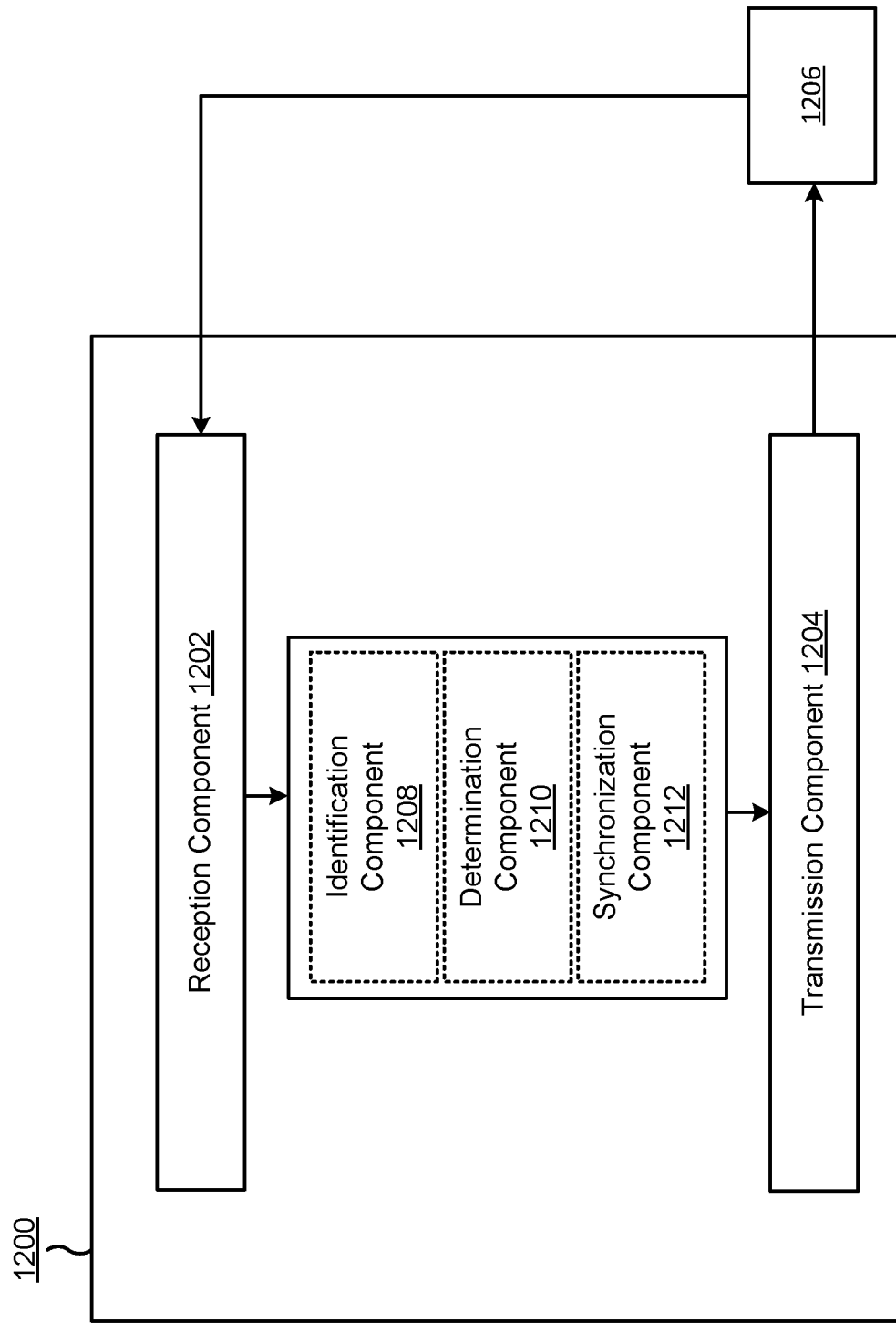
FIG. 12 is a block diagram of an example apparatus for wireless communication, in accordance with various aspects of the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include an identification component 1208, a determination component 1210, and/or a synchronization component 1212, among other examples.

In some aspects, the apparatus 1200 may be configured to perform one or more operations described herein in connection with FIGS. 3-5 and 8-11. Additionally or alternatively, the apparatus 1200 may be configured to perform one or more processes described herein, such as process 600 of FIG. 6, process 700 of FIG. 7, process 1000 of FIG. 10, process 1100 of FIG. 11, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The identification component 1208 may identify a plurality of UEs for a UE positioning session. In some aspects, the identification component 1208 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The identification component 1208 may identify a set of parameters for the UE positioning session. In some aspects, the identification component 1208 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1204 may broadcast information indicating the UE positioning session. The reception component 1202 may receive, from the plurality of UEs, a set of positioning reference signals (PRSs) based at least in part on the set of parameters. The transmission component 1204 may broadcast, based at least in part on the set of PRSs, positioning information.

The reception component 1202 may receive one or more basic safety messages (BSMs) from the plurality of UEs, wherein the identification of the plurality of UEs is based at least in part on the one or more BSMs.

The transmission component 1204 may broadcast a PRS based at least in part on the set of parameters. In some aspects, the transmission component 1204 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 1210 may determine a range relative to one or more UEs, of the plurality of UEs, based at least in part on the second positioning information. For example, the determination component may determine ranging information. In some aspects, the determination component 1210 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The synchronization component 1212 may perform synchronization based at least in part on the information indicating the UE positioning session and the second positioning information. In some aspects, the synchronization component 1212 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 1202 may receive, from a UE of the plurality of UEs, an acknowledgment of the information indicating the UE positioning session.

The reception component 1202 may receive, from a UE of the plurality of UEs and based at least in part on the information indicating the UE positioning session, information indicating a modified parameter for the UE positioning session.

The determination component 1210 may determine a time for broadcasting the positioning information, wherein the positioning information is broadcast at the time. In some aspects, the determination component 1210 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 1202 may receive, from a UE, broadcasted information indicating a set of parameters for a UE positioning session. The transmission component 1204 may broadcast a first set of PRSs based at least in part on the set of parameters. The reception component 1202 may receive a second set of PRSs based at least in part on the set of parameters. The transmission component 1204 may broadcast positioning information, based at least in part on at least one of the first set of PRSs or the second set of PRSs.

The determination component 1210 may determine a range relative to the UE based at least in part on the second positioning information.

The synchronization component 1212 may perform synchronization based at least in part on the information indicating the UE positioning session and the second positioning information. In some aspects, the synchronization component 1212 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 1204 may transmit an acknowledgment of the information indicating the UE positioning session.

The transmission component 1204 may transmit, based at least in part on the information indicating the UE positioning session, information indicating a modified parameter for the UE positioning session.

The determination component 1210 may determine a time for broadcasting the positioning information, wherein the positioning information is broadcast at the time.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying or traversing a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In view of this description, some implementations may include different combinations of features. Implementation examples are described in the following numbered clauses:

Clause 1: A method for positioning distributed devices, the method performed by an anchor user equipment (UE) and comprising: detecting, from a plurality of initiator user equipments (UEs), respective initiator positioning reference signal (PRS) transmissions associated with respective initiator positioning sessions; determining, based on the initiator PRS transmissions, one or more characteristics of PRS messaging associated with the initiator positioning sessions; determining that the one or more characteristics satisfies a criterion or criteria; and broadcasting, responsive to determining that the one or more characteristics satisfies the criterion or criteria, an anchor PRS transmission indicating initiation of an anchor positioning session by the anchor UE.

Clause 2: The method of clause 1, further comprising: identifying the anchor UE as having an initiator role for the anchor positioning session; and identifying one or more of the initiator UEs as having a responder role for the anchor positioning session.

Clause 3: The method of clause 1 or clause 2, wherein the initiator PRS transmissions comprise a pre-PRS message, and the anchor PRS transmission comprises a pre-PRS message.

Clause 4: The method of clause 3, further comprising: detecting, from the initiator UEs, respective PRS messages associated with the respective initiator positioning sessions.

Clause 5: The method of any one of clauses 1-4, wherein determining the one or more characteristics of PRS messaging associated with the initiator positioning sessions comprises: identifying, over a designated timeframe, a count of the initiator UEs associated with the initiator PRS transmissions.

Clause 6: The method of clause 5, wherein determining that the one or more characteristics satisfies the criterion or criteria comprises: determining that the count of initiator UEs identified over the designated timeframe traverses a designated threshold.

Clause 7: The method of any one of clauses 1-6, wherein the anchor PRS transmission comprises an instruction to a recipient UE to stop or suspend initiation of positioning sessions.

Clause 8: The method of any one of clauses 1-7, further comprising: monitoring pre-PRS messaging from the initiator UEs; and responsive to determining from the pre-PRS messaging that one or more of the initiator UEs no longer requests the anchor positioning session, stopping or suspending the anchor positioning session.

Clause 9: The method of any one of clauses 1-8, further comprising: obtaining, from a further anchor UE, a further anchor PRS transmission indicating initiation of a further anchor positioning session by the further anchor UE; and operating, responsive to obtaining the further anchor PRS transmission, as a responder UE.

Clause 10: An anchor UE for wireless communication, the anchor UE comprising: a transceiver; a memory; and one or more processors communicatively coupled with the memory and the transceiver, the one or more processors configured to: detect, from a plurality of initiator UEs, respective initiator PRS transmissions associated with respective initiator positioning sessions; determine, based on the initiator PRS transmissions, one or more characteristics of PRS messaging associated with the initiator positioning sessions; determine that the one or more characteristics satisfies a criterion or criteria; and broadcast, responsive to determining that the one or more characteristics satisfies the criterion or criteria, an anchor PRS transmission indicating initiation of an anchor positioning session by the anchor UE.

Clause 11: The anchor UE of clause 10, wherein the one or more processors are further configured to: identify the anchor UE as having an initiator role for the anchor positioning session; and identify one or more of the initiator UEs as having a responder role for the anchor positioning session.

Clause 12: The anchor UE of clause 10 or clause 11, wherein the initiator PRS transmissions comprise a pre-PRS message, and the anchor PRS transmission comprises a pre-PRS message.

Clause 13: The anchor UE of clause 12, wherein the one or more processors are further configured to: detect, from the initiator UEs, respective PRS messages associated with the respective initiator positioning sessions.

Clause 14: The anchor UE of any one of clauses 10-13, wherein the one or more processors configured to determine the one or more characteristics of PRS messaging associated with the initiator positioning sessions comprise the one or more processors configured to identify, over a designated timeframe, a count of the initiator UEs associated with the initiator PRS transmissions.

Clause 15: The anchor UE of clause 14, wherein the one or more processors configured to determine that the one or more characteristics satisfies the criterion or criteria comprises the one or more processors configured to determine that the count of initiator UEs identified over the designated timeframe traverses a designated threshold.

Clause 16: The anchor UE of any one of clauses 10-15, wherein the anchor PRS transmission comprises an instruction to a recipient UE to stop or suspend initiation of positioning sessions.

Clause 17: The anchor UE of any one of clauses 10-16, wherein the one or more processors are further configured to: monitor pre-PRS messaging from the initiator UEs; and responsive to determining from the pre-PRS messaging that one or more of the initiator UEs no longer requests the anchor positioning session, stop or suspend the anchor positioning session.

Clause 18: The anchor UE of any one of clauses 10-17, wherein the one or more processors are further configured to: obtain, from a further anchor UE, a further anchor PRS transmission indicating initiation of a further anchor positioning session by the further anchor UE; and operate, responsive to obtaining the further anchor PRS transmission, as a responder UE.

Clause 19: A method for positioning distributed devices, the method performed by an initiator UE and comprising: broadcasting, to a plurality of UEs comprising an anchor UE, one or more initiator PRS transmissions associated with an initiator positioning session; obtaining, from the anchor UE, an anchor PRS transmission indicating initiation of an anchor positioning session by the anchor UE with the anchor UE having an initiator role and the initiator UE having a responder role; and stopping or suspending initiation of positioning sessions responsive to obtaining the anchor PRS transmission.

Clause 20: The method of clause 19, further comprising: sending, to the anchor UE, a communication acknowledging that the initiator UE received the anchor PRS transmission; and sending, to the anchor UE, a communication requesting the anchor positioning session.

Clause 21: The method of clause 19 or clause 20, further comprising: sending, to the anchor UE, after stopping or suspending initiation of positioning sessions, one or more responding pre-PRS messages associated with the anchor positioning session.

Clause 22: The method of clause 21, further comprising: stopping or suspending the sending of the one or more responding pre-PRS messages to indicate that the initiator UE no longer requests the anchor positioning session.

Clause 23: The method of clause 22, further comprising: obtaining, from the anchor UE, a notification indicating that the initiator UE can initiate positioning sessions; and broadcasting, responsive to obtaining the notification, to the plurality of UEs, one or more further initiator PRS transmissions associated with a further initiator positioning session.

Clause 24: The method of any one of clauses 19-23, wherein the initiator PRS transmission comprises a pre-PRS message, and the anchor PRS transmission comprises a pre-PRS message.

Clause 25: An initiator UE for wireless communication, the initiator UE comprising: a transceiver, a memory; and one or more processors communicatively coupled with the memory and the transceiver, the one or more processors configured to: broadcast, to a plurality of UEs comprising an anchor UE, one or more initiator PRS transmissions associated with an initiator positioning session; obtain, from the anchor UE, an anchor PRS transmission indicating initiation of an anchor positioning session by the anchor UE with the anchor UE having an initiator role and the initiator UE having a responder role; and stop or suspend initiation of positioning sessions responsive to obtaining the anchor PRS transmission.

Clause 26: The initiator UE of clause 25, wherein the one or more processors are further configured to: send, to the anchor UE, a communication acknowledging that the initiator UE received the anchor PRS transmission; and send, to the anchor UE, a communication requesting the anchor positioning session.

Clause 27: The initiator UE of clause 25 or clause 26, wherein the one or more processors are further configured to: send, to the anchor UE, after stopping or suspending initiation of positioning sessions, one or more responding pre-PRS messages associated with the anchor positioning session.

Clause 28: The initiator UE of clause 27, wherein the one or more processors are further configured to: stop or suspend the sending of the one or more responding pre-PRS messages to indicate that the initiator UE no longer requests the anchor positioning session.

Clause 29: The initiator UE of clause 28, wherein the one or more processors are further configured to: obtain, from the anchor UE, a notification indicating that the initiator UE can initiate positioning sessions; and broadcast, responsive to obtaining the notification, to the plurality of UEs, one or more further initiator PRS transmissions associated with a further initiator positioning session.

Clause 30: The initiator UE of any one of clauses 25-29, wherein the initiator PRS transmission comprises a pre-PRS message, and the anchor PRS transmission comprises a pre-PRS message.

What is claimed is:

1. A method for positioning distributed devices, the method performed by an anchor user equipment (UE) and comprising:
   detecting, from a plurality of initiator user equipments (UEs), respective initiator positioning reference signal (PRS) transmissions associated with respective initiator positioning sessions in which the initiator UEs have an initiator role and the anchor UE has a responder role;
   determining, based on the initiator PRS transmissions, one or more characteristics of PRS messaging associated with the initiator positioning sessions;
   determining that the one or more characteristics satisfies a criterion or criteria; and
   broadcasting, responsive to determining that the one or more characteristics satisfies the criterion or criteria, an anchor PRS transmission indicating initiation of an anchor positioning session in which the anchor UE has the initiator role and the initiator UEs have the responder role.

2. The method of claim 1, further comprising:
identifying the anchor UE as having the initiator role for the anchor positioning session; and
identifying one or more of the initiator UEs as having the responder role for the anchor positioning session.

3. The method of claim 1, wherein the initiator PRS transmissions comprise a pre-PRS message, and the anchor PRS transmission comprises a pre-PRS message.

4. The method of claim 3, further comprising:
detecting, from the initiator UEs, respective PRS messages associated with the respective initiator positioning sessions.

5. The method of claim 1, wherein determining the one or more characteristics of PRS messaging associated with the initiator positioning sessions comprises:
identifying, over a designated timeframe, a count of the initiator UEs associated with the initiator PRS transmissions.

6. The method of claim 5, wherein determining that the one or more characteristics satisfies the criterion or criteria comprises:
determining that the count of initiator UEs identified over the designated timeframe traverses a designated threshold.

7. The method of claim 1, wherein the anchor PRS transmission comprises an instruction to a recipient UE to stop or suspend initiation of positioning sessions.

8. The method of claim 1, further comprising:
monitoring pre-PRS messaging from the initiator UEs; and
responsive to determining from the pre-PRS messaging that one or more of the initiator UEs no longer requests the anchor positioning session, stopping or suspending the anchor positioning session.

9. The method of claim 1, further comprising:
obtaining, from a further anchor UE, a further anchor PRS transmission indicating initiation of a further anchor positioning session by the further anchor UE; and
operating, responsive to obtaining the further anchor PRS transmission, as a responder UE.

10. An anchor UE for wireless communication, the anchor UE comprising:
a transceiver;
a memory; and
one or more processors communicatively coupled with the memory and the transceiver, the one or more processors configured to:
detect, from a plurality of initiator UEs, respective initiator PRS transmissions associated with respective initiator positioning sessions in which the initiator UEs have an initiator role and the anchor UE has a responder role;
determine, based on the initiator PRS transmissions, one or more characteristics of PRS messaging associated with the initiator positioning sessions;
determine that the one or more characteristics satisfies a criterion or criteria; and
broadcast, responsive to determining that the one or more characteristics satisfies the criterion or criteria, an anchor PRS transmission indicating initiation of an anchor positioning session in which the anchor UE has the initiator role and the initiator UEs have the responder role.

11. The anchor UE of claim 10, wherein the one or more processors are further configured to:
identify the anchor UE as having the initiator role for the anchor positioning session; and
identify one or more of the initiator UEs as having the responder role for the anchor positioning session.

12. The anchor UE of claim 10, wherein the initiator PRS transmissions comprise a pre-PRS message, and the anchor PRS transmission comprises a pre-PRS message.

13. The anchor UE of claim 12, wherein the one or more processors are further configured to:
detect, from the initiator UEs, respective PRS messages associated with the respective initiator positioning sessions.

14. The anchor UE of claim 10, wherein the one or more processors configured to determine the one or more characteristics of PRS messaging associated with the initiator positioning sessions comprise the one or more processors configured to identify, over a designated timeframe, a count of the initiator UEs associated with the initiator PRS transmissions.

15. The anchor UE of claim 14, wherein the one or more processors configured to determine that the one or more characteristics satisfies the criterion or criteria comprise the one or more processors configured to determine that the count of initiator UEs identified over the designated timeframe traverses a designated threshold.

16. The anchor UE of claim 10, wherein the anchor PRS transmission comprises an instruction to a recipient UE to stop or suspend initiation of positioning sessions.

17. The anchor UE of claim 10, wherein the one or more processors are further configured to:
monitor pre-PRS messaging from the initiator UEs; and
responsive to determining from the pre-PRS messaging that one or more of the initiator UEs no longer requests the anchor positioning session, stop or suspend the anchor positioning session.

18. The anchor UE of claim 10, wherein the one or more processors are further configured:
obtain, from a further anchor UE, a further anchor PRS transmission indicating initiation of a further anchor positioning session by the further anchor UE; and
operate, responsive to obtaining the further anchor PRS transmission, as a responder UE.

19. A method for positioning distributed devices, the method performed by an initiator UE and comprising:
broadcasting, to a plurality of UEs comprising an anchor UE, one or more initiator PRS transmissions associated with an initiator positioning session in which the initiator UE has an initiator role and the anchor UE has a responder role;
obtaining, from the anchor UE, an anchor PRS transmission indicating initiation of an anchor positioning session by the anchor UE with the anchor UE having the initiator role and the initiator UE having the responder role; and
stopping or suspending initiation of positioning sessions responsive to obtaining the anchor PRS transmission.

20. The method of claim 19, further comprising:
sending, to the anchor UE, a communication acknowledging that the initiator UE received the anchor PRS transmission; and
sending, to the anchor UE, a communication requesting the anchor positioning session.

21. The method of claim 19, further comprising:
sending, to the anchor UE, after stopping or suspending initiation of positioning sessions, one or more responding pre-PRS messages associated with the anchor positioning session.

22. The method of claim 21, further comprising:
stopping or suspending the sending of the one or more responding pre-PRS messages to indicate that the initiator UE no longer requests the anchor positioning session.

23. The method of claim 22, further comprising:
obtaining, from the anchor UE, a notification indicating that the initiator UE can initiate positioning sessions; and
broadcasting, responsive to obtaining the notification, to the plurality of UEs, one or more further initiator PRS transmissions associated with a further initiator positioning session.

24. The method of claim 19, wherein the initiator PRS transmission comprises a pre-PRS message, and the anchor PRS transmission comprises a pre-PRS message.

25. An initiator UE for wireless communication, the initiator UE comprising:
a transceiver;
a memory; and
one or more processors communicatively coupled with the memory and the transceiver, the one or more processors configured to:
broadcast, to a plurality of UEs comprising an anchor UE, one or more initiator PRS transmissions associated with an initiator positioning session in which the initiator UE has an initiator role and the anchor UE has a responder role;
obtain, from the anchor UE, an anchor PRS transmission indicating initiation of an anchor positioning session by the anchor UE with the anchor UE having the initiator role and the initiator UE having the responder role; and
stop or suspend initiation of positioning sessions responsive to obtaining the anchor PRS transmission.

26. The initiator UE of claim 25, wherein the one or more processors are further configured to:
send, to the anchor UE, a communication acknowledging that the initiator UE received the anchor PRS transmission; and
send, to the anchor UE, a communication requesting the anchor positioning session.

27. The initiator UE of claim 25, wherein the one or more processors are further configured to:
send, to the anchor UE, after stopping or suspending initiation of positioning sessions, one or more responding pre-PRS messages associated with the anchor positioning session.

28. The initiator UE of claim 27, wherein the one or more processors are further configured to:
stop or suspend the sending of the one or more responding pre-PRS messages to indicate that the initiator UE no longer requests the anchor positioning session.

29. The initiator UE of claim 28, wherein the one or more processors are further configured to:
obtain, from the anchor UE, a notification indicating that the initiator UE can initiate positioning sessions; and
broadcast, responsive to obtaining the notification, to the plurality of UEs, one or more further initiator PRS transmissions associated with a further initiator positioning session.

30. The initiator UE of claim 25, wherein the initiator PRS transmission comprises a pre-PRS message, and the anchor PRS transmission comprises a pre-PRS message.

* * * * *